(12) United States Patent
Kim

(10) Patent No.: US 12,252,092 B2
(45) Date of Patent: Mar. 18, 2025

(54) SEAT BELT DEVICE FOR VEHICLE AND METHOD OF MOUNTING SAME

(71) Applicants: Hyundai Motor Company, Seoul (KR); Kia Corporation, Seoul (KR)

(72) Inventor: Young Rok Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/388,955

(22) Filed: Nov. 13, 2023

(65) Prior Publication Data

US 2025/0050835 A1 Feb. 13, 2025

(30) Foreign Application Priority Data

Aug. 8, 2023 (KR) ........................ 10-2023-0103474

(51) Int. Cl.
*B60R 22/18* (2006.01)
*B60R 22/48* (2006.01)

(52) U.S. Cl.
CPC .............. *B60R 22/18* (2013.01); *B60R 22/48* (2013.01)

(58) Field of Classification Search
CPC . B60R 22/18; B60R 22/48; B60R 2022/1818; B60R 2022/207; B60N 2/688
See application file for complete search history.

(56) References Cited

U.S. PATENT DOCUMENTS

| | | | | |
|---|---|---|---|---|
| 4,132,434 A | * | 1/1979 | Takahashi | B60R 22/26 280/801.1 |
| 4,496,170 A | * | 1/1985 | Sasaki | B60R 22/03 280/801.1 |
| 4,993,778 A | * | 2/1991 | Colin | B60R 22/26 297/483 |
| 5,026,225 A | * | 6/1991 | McIntyre | A61G 3/0808 280/808 |
| 5,031,961 A | * | 7/1991 | Isern | B60R 22/26 297/473 |
| 5,044,664 A | * | 9/1991 | Mogi | B60R 22/48 297/468 |
| 5,152,552 A | * | 10/1992 | Ikegaya | B60R 22/1958 297/480 |
| 5,318,341 A | * | 6/1994 | Griswold | B60N 2/66 297/483 |

(Continued)

FOREIGN PATENT DOCUMENTS

| | | | | |
|---|---|---|---|---|
| JP | 2022028071 A | * | 2/2022 | B60N 2/06 |
| KR | 20-1998-0040590 U | | 9/1998 | |

OTHER PUBLICATIONS

JP-2022028071-A; Translation attached.*

*Primary Examiner* — Paul N Dickson
*Assistant Examiner* — Shams Dhanani
(74) *Attorney, Agent, or Firm* — Fox Rothschild LLP

(57) ABSTRACT

A seat belt device is implemented as an independent and movably installable seat belt that enables multi-purpose use of a vehicle through multi-functionality of a seat of the vehicle. The seat belt device includes a belt post having a seat belt assembly, the belt post being mounted inside an interior of the vehicle, and a buckle post in which an arm and a buckle are connected to the belt post in a multi-joint structure, where the buckle is positioned on another side of the seat due to a joint rotation of the arm and the buckle.

20 Claims, 27 Drawing Sheets

(56) References Cited

U.S. PATENT DOCUMENTS

| | | | | |
|---|---|---|---|---|
| 5,544,917 | A * | 8/1996 | Loxton | B60R 22/26 280/808 |
| 5,823,627 | A * | 10/1998 | Viano | B60N 2/688 297/483 |
| 5,924,772 | A * | 7/1999 | Pleyer | B60R 22/20 297/473 |
| 5,988,758 | A * | 11/1999 | Heintzelman | B60R 22/26 297/483 |
| 7,997,620 | B1 * | 8/2011 | Dong | B60R 22/03 280/805 |
| 11,414,046 | B1 * | 8/2022 | Charopoulos | B60N 2/688 |
| 11,590,921 | B1 * | 2/2023 | Farooq | B60R 22/18 |
| 2002/0134590 | A1 * | 9/2002 | Wolfe | B60R 21/01556 177/144 |
| 2005/0206150 | A1 * | 9/2005 | Yamaguchi | B60R 22/03 280/801.1 |
| 2005/0269846 | A1 * | 12/2005 | Vits | B60N 2/242 297/216.1 |
| 2006/0181073 | A1 * | 8/2006 | Sugiyama | B60R 22/03 280/808 |
| 2007/0040373 | A1 * | 2/2007 | Tilly | B60R 22/26 280/801.1 |
| 2007/0096450 | A1 * | 5/2007 | Gyllenspetz | B60R 22/03 280/801.1 |
| 2008/0018151 | A1 * | 1/2008 | Brown | B60N 2/233 296/65.01 |
| 2008/0067829 | A1 * | 3/2008 | Arias | B60R 22/22 296/65.03 |
| 2008/0143093 | A1 * | 6/2008 | Kojima | B60R 22/26 280/801.2 |
| 2008/0246327 | A1 * | 10/2008 | Collins | B60R 22/02 297/476 |
| 2008/0309111 | A1 * | 12/2008 | Marriott | B60N 2/688 280/808 |
| 2011/0260482 | A1 * | 10/2011 | Bourgraf | B60N 2/34 296/19 |
| 2012/0212029 | A1 * | 8/2012 | Wada | B60N 2/38 297/479 |
| 2013/0088001 | A1 * | 4/2013 | Park | B60R 22/03 297/481 |
| 2014/0367946 | A1 * | 12/2014 | Osterhout | B60R 22/20 280/730.2 |
| 2015/0266448 | A1 * | 9/2015 | Aoki | B60N 2/688 297/354.1 |
| 2016/0236645 | A1 * | 8/2016 | Klein | B60R 22/03 |
| 2017/0028965 | A1 * | 2/2017 | Ohno | B60R 22/06 |
| 2017/0291576 | A1 * | 10/2017 | Le | B60R 22/12 |
| 2018/0079334 | A1 * | 3/2018 | Zheng | B60N 2/20 |
| 2018/0272987 | A1 * | 9/2018 | Cuddihy | B60R 22/34 |
| 2020/0164832 | A1 * | 5/2020 | Mito | B60N 2/0715 |
| 2022/0097649 | A1 * | 3/2022 | Bok | B60R 16/027 |
| 2022/0203927 | A1 * | 6/2022 | Cech | B60R 22/26 |
| 2022/0242361 | A1 * | 8/2022 | Agam | B60N 2/242 |
| 2023/0182677 | A1 * | 6/2023 | Song | B60R 22/24 280/808 |
| 2024/0140352 | A1 * | 5/2024 | Schneider | B60R 22/26 |

* cited by examiner

SEAT BELT DEVICE FOR VEHICLE AND METHOD OF MOUNTING SAME

CROSS REFERENCE TO RELATED APPLICATION

The present application claims under 35 U.S.C. § 119(a) the benefit of Korean Patent Application No. 10-2023-0103474 filed on Aug. 8, 2023, the entire contents of which are incorporated by reference herein.

BACKGROUND

(a) Technical Field

The present disclosure relates to a seat belt device for a vehicle, more particularly, to the seat belt device that is implemented as an independent and movably installable seat belt for enabling multi-purpose use of the vehicle through multi-functionality of a seat, and a method of mounting the same.

(b) Description of the Related Art

Recently, vehicles have been equipped with enhanced interior innovation functions, such as seats that can be freely attached and detached, slid longer, and rotated.

To implement these seat functions, a built in seat (BIS)-type seat belt has been used.

However, since strength of a seat frame increases to withstand a load of the seat belt, the BIS type seat belt has a problem of increasing a seat weight and material costs.

In addition, since a weight of the seat belt itself is included in the seat weight, thus making the seat heavy, when the seat is attached/detached, rotated, and slid, a considerable force is required to manipulate the seat by a user of the vehicle, thus degrading usability.

Moreover, due to government regulations that strictly regulate implementation of the seat belt, there is also a problem in that restrictions on a seat size, a seat shape, and seat design may be greater than when the seat is used alone.

In addition, when the seat belt is not a BIS type seat belt, there is a disadvantage in that the seat belt may directly remain in an interior of the vehicle and become a hindrance when the seat is detached or folded in a folding seat.

In addition, due to regulations and usability of the seat belt, a sliding length may be restricted and rotation may not be possible, and in the case of a switchable seat (a seat that can simply switch back and forth) to overcome swivel limitations, there is a disadvantage of having a complicated structure when the seat belt is the BIS type seat belt.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a seat belt device that is implemented as an independent and movably installable seat belt for enabling multi-purpose use of a vehicle through multi-functionality of a seat, and a method of mounting the same.

According to one aspect, there is provided a seat belt device including a belt post having a seat belt assembly, is the belt post being mounted inside a vehicle interior and, where a webbing of a seat belt is provided at one side of a seat; and a buckle post in which an arm and a buckle are connected to the belt post in a multi-joint structure, and the buckle is positioned on another side of the seat due to joint rotation of the arm and the buckle.

The belt post may be formed in a vertical lengthwise direction and may be mounted on at least one of a floor part or a roof part of an interior of the vehicle.

The belt post may be configured to be adjusted in height in the lengthwise direction.

A webbing outgoing hole through which a webbing enters and exits may be formed in the belt post, and the webbing outgoing hole may be rotated about an axis of the belt post.

A buckle post may be mounted on an outer surface of the belt post.

An accommodation hole may be formed on a side surface of the belt post, and the buckle post may be mounted on an inner surface of the accommodation hole so that the buckle post may be accommodated in the accommodation hole.

The buckle post may be folded in a shape in which the arm overlaps in a lengthwise direction of the belt post and may be folded in a shape in which the buckle overlaps in a lengthwise direction of the arm.

The buckle post may include a first arm having one end connected to the belt post in a hinge structure, and another end rotated toward the other side of the seat and unfolded; a second arm having one end connected to the other end of the first arm in a hinge structure and the other end rotated and unfolded toward a front side of the seat; and a buckle having one end connected to the other end of the second arm in a hinge structure, and the other end rotated toward an upper portion of the seat and unfolded.

The first arm may be rotated and unfolded about an X-axis, the second arm may be rotated and unfolded about a Z-axis, and the buckle may be rotated about a Y-axis.

At least one of the first arm or the second arm may be configured to be adjusted in length in the lengthwise direction.

The first arm may be coupled by a fixation mechanism provided on the seat or the floor part to be maintained in an unfolded state.

The fixation mechanism may be a latch that is caught on an upper or lower surface of the first arm through a rotation.

The fixation mechanism may be a slide locker that is inserted into and caught to the first arm through a sliding movement.

The belt post may be mounted on a seat frame moved together with the seat.

The seat belt device may further include a first slave sensor installed at a designated position of the belt post, a second slave sensor installed at a designated position of the buckle post, a master sensor installed at the seat and configured to detect the positions of the first and second slave sensors through communication with the first and second slave sensors, and a controller configured to determine whether the positions of the first and second slave sensors detected through the master sensor are within a normal installation area and determine whether the belt post and the buckle post are installed normally.

A vehicle may include the above-described seat belt device.

According to another aspect, there is provided a method of mounting a seat belt device, which includes when a belt post is mounted on one side of a seat, a first position detection operation of detecting, by a master sensor installed on the seat, a position of a first slave sensor installed at a designated position on the belt post; a first position determination operation of determining, by a controller, whether the position of the first slave sensor is within a normal installation area and determining whether the belt post is installed normally; when it is determined that the belt post is installed normally, a buckle rotation operation of rotating a multi-joint structure of the buckle post to position the buckle on the other side of the seat; when a buckle post is mounted on the other side of the seat, a second position detection operation of detecting, by the master sensor, a position of a second slave sensor installed at a designated position on the buckle post; and a second position determination operation of determining, by a controller, whether the position of the second slave sensor is within a normal installation area and determining whether the belt post is installed normally.

When it is determined that the belt post is installed normally in the first position determination operation, a message related to an operation of moving the buckle post may be transmitted.

When it is determined that the belt post is installed abnormally in the first position determination operation, a message related to incorrect installation of the belt post and a message inducing re-installation of the belt post may be transmitted.

When it is determined that the buckle post is installed abnormally in the second position determination operation, a message inducing a position adjustment of the buckle may be transmitted.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
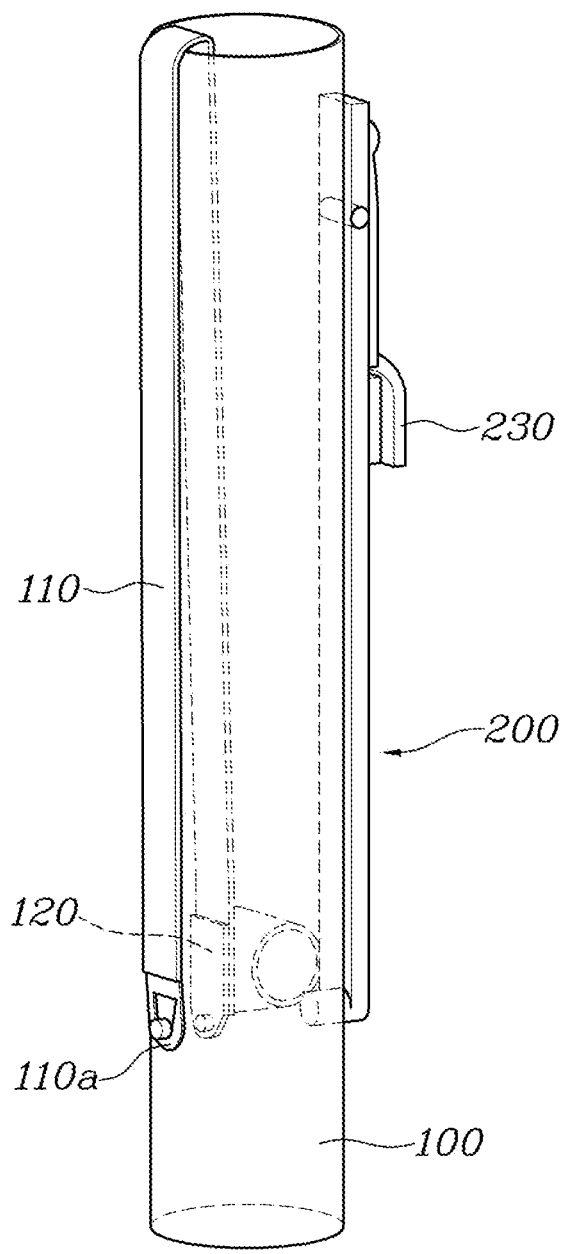
FIG. 1 is a diagram illustrating a shape in which a buckle post is folded in a belt post according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the drawings. The same reference numerals are given to the same or similar components regardless of reference numerals, and a repetitive description thereof will be omitted.

In describing embodiments disclosed in the present specification, when a detailed description of a known related art is determined to obscure the gist of the present specification, the detailed description thereof will be omitted herein. In addition, the accompanying drawings are merely for easy understanding of the embodiments disclosed in the present specification, the technical spirit disclosed in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for the purpose of distinguishing one component from another component.

When a component is referred to as being "connected" or "coupled" to another component, the component may be directly connected or coupled to another component, but it should be understood that sill another component may be present between the component and another component. On the contrary, when a component is referred to as being "directly connected," or "directly coupled" to another component, it should be understood that still another component may not be present between the component and another component.

Unless the context clearly dictates otherwise, the singular form includes the plural form.

A controller may include a communication device for communicating with other control units or sensors to control a responsible function, a memory for storing an operating system, a logic command, and input/output information, and one or more processors for performing determination, calculation, and decision which are necessary for controlling the responsible function.

Exemplary embodiments of the present disclosure will be described in detail below with reference to the accompanying drawings.

A seat belt device according to the present disclosure includes a belt post 100 which includes a seat belt assembly and is mounted inside a vehicle interior and in which a webbing 110 of a seat belt is provided to exit and enter at one side of a seat 10, and a buckle post 200 in which an arm and a buckle 230 are connected to the belt post 100 in a multi-joint structure, and a buckle 230 is positioned on one side of the seat 10 due to a joint rotation of the arm and the buckle 230.

Figure 2:
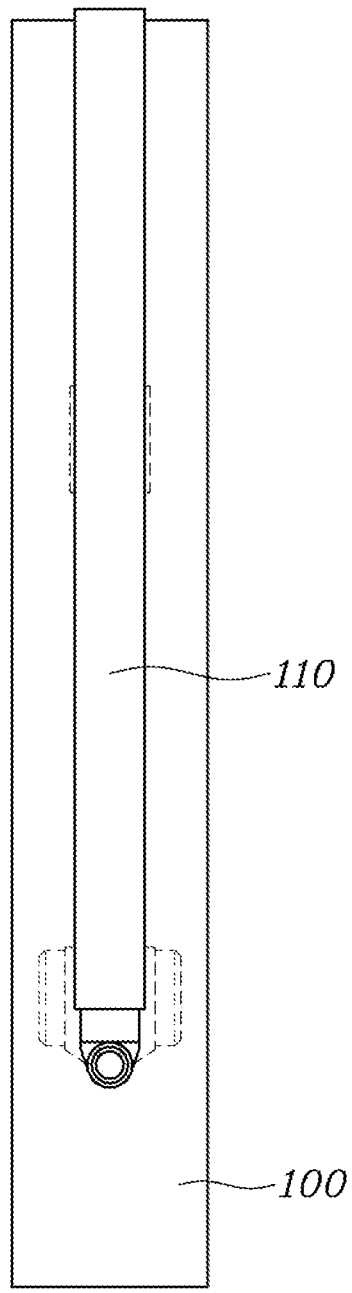
FIG. 2 is a diagram illustrating the belt post according to the present disclosure from a belt direction.
Figure 3:
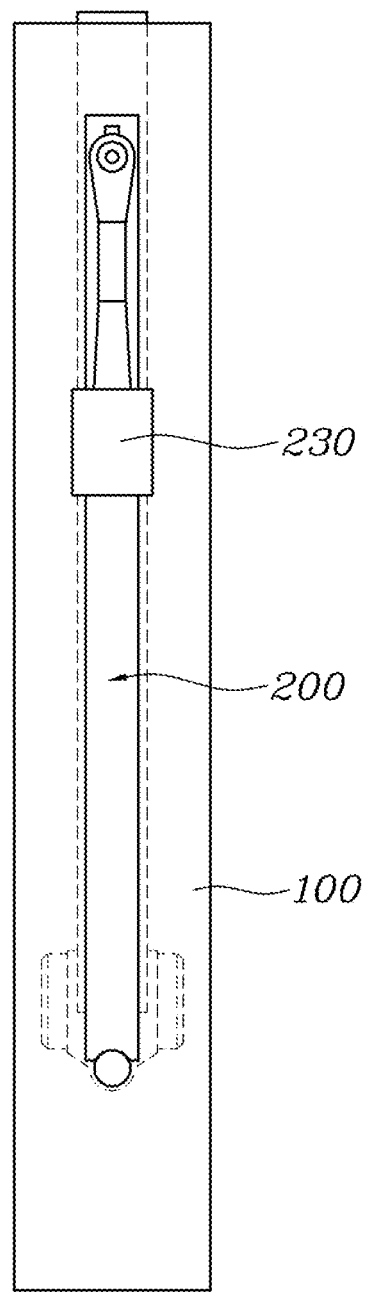
FIG. 3 is a diagram illustrating the belt post according to the present disclosure from a buckle post direction.

To describe with reference to FIGS. 1 to 3, the belt post 100 is installed on a side surface of an outboard of the seat 10, and the buckle post 200 is connected to a lower portion of a side surface of the belt post 100.

A seat belt assembly, which includes the webbing 110 to which the tongue is connected together with a retractor 120, and a webbing outgoing hole 130 for exiting the webbing 110, is installed on the belt post 100.

In the buckle post 200, a plurality of arms are connected in a multi-joint structure, and the buckle 230 is connected to an end portion of the arm so that the buckle 230 may be positioned on another (i.e., the other) side of the seat 10, that is, the side surface of an inboard, through joint rotations of the arms.

Thus, the tongue connected to the webbing 110 of the belt post 100 is pulled toward the buckle 230 and fastened to the buckle 230 so that a passenger seated on the seat 10 is able to wear a seat belt.

In this way, according to the present disclosure, the seat 10 and the seat belt are separated, and thus the seat belt capable of being moved and installed independently is implemented so that functionality of the seat 10 can be improved, a multipurpose in using a vehicle can be possible through versatility of the seat 10, and when designing a seat frame to implement a function of the seat 10, it is possible to increase a degree of design freedom by being free from restrictions due to the seat belt.

In addition, since the seat belt is separated and one type of seat belt may respond to seat belt specifications of various vehicle types, it is possible to reduce a weight of the seat 10 and to commonly use seat belts for all vehicle types so that material costs can be reduced and high marketability can be secured through various designs.

In addition, when the seat 10 is removed, the seat belt may be removed together with the seat 10, and thus the seat belt is not remained unnecessarily in the vehicle interior so that space utilization is improved.

In addition, in the present disclosure, the belt post 100 is formed in a vertical length direction and may be mounted on at least one of a floor part 20 or a roof part of the vehicle interior.

Specifically, a lower end of the belt post 100 may be mounted on the floor part 20, which is a bottom surface of the vehicle interior, and an upper end of the belt post 100 may be mounted on the roof part to be fixed to a vehicle body. In addition to the above description, a pillar part, a quarter part, a roof panel, and the like may be fixed to an inside of the vehicle interior.

The belt post 100 may be easily fastened, fastened in a structure satisfying a predetermined fastening strength, and fastened manually or automatically.

A method in which the belt post 100 is manually fastened to the floor part 20 is that a lever is provided at the lower end of the belt post 100, and the belt post 100 may be fixed in an intuitive manner of directly lowering the lever or lowering and then turning the lever.

Alternatively, according to a fastening structure, a method of automatically fixing the lever to the floor part 20 while the lever is moved down, a method of lowering and then fixing the lever through a rotation, and a fastening method, such as ski boots, of inserting a front portion of the lever and then inserting a rear portion thereof may be applied.

In addition, a method in which the belt post 100 is automatically fastened to the floor part 20 may be a method in which an operation of lowering and turning the lever is automatically performed.

In order to fasten the belt post 100, a structure in which the above-described fastening is performed is provided around where the belt post 100 is mounted.

In addition, an electrical switch or sensor is installed to check whether the belt post 100 is fastened, and a signal detected from the sensor may be input to a controller C, which will be described below, to check whether the belt post 100 is mounted.

For reference, the belt post 100 may be formed in a cylindrical shape, may be formed in various shapes depending on the design and use, and may be formed in slim design to increase loadability.

In addition, in the present disclosure, the belt post 100 may be formed to be adjustable in height in a lengthwise direction.

Figure 5:
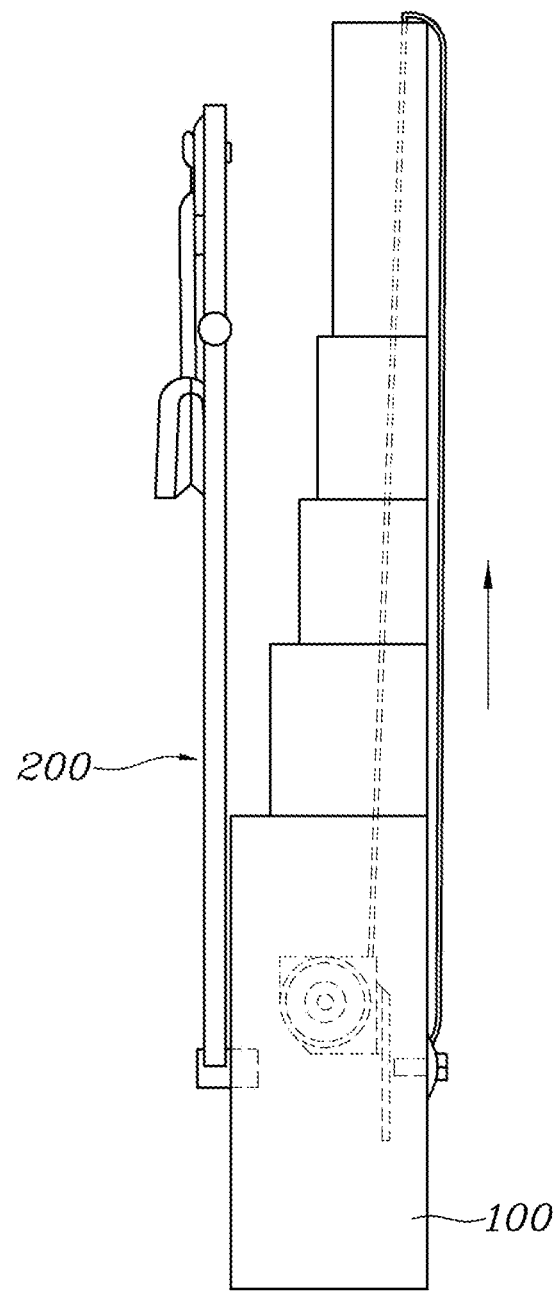
FIGS. 5 and 6 are diagrams for describing a structure of an embodiment in which a vertical length of the belt post is adjusted according to the present disclosure.
Figure 6:
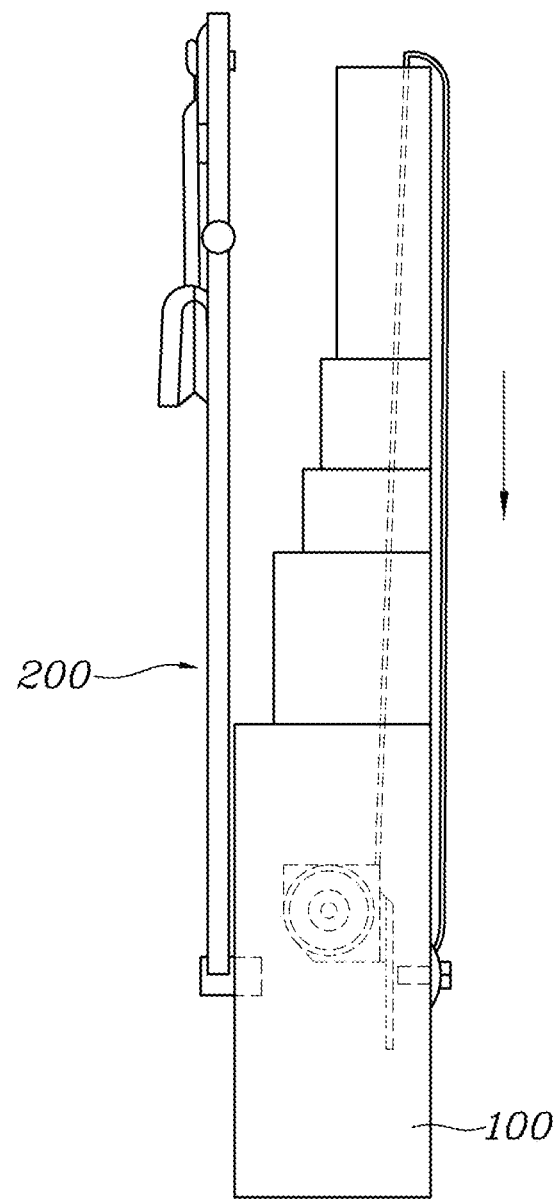

As one example, as shown in FIGS. 5 and 6, a multistage structure is provided inside and outside the belt post 100, and thus an upper portion of the belt post 100 may be vertically moved in a telescopic manner to adjust the height of the belt post 100.

Figure 7:
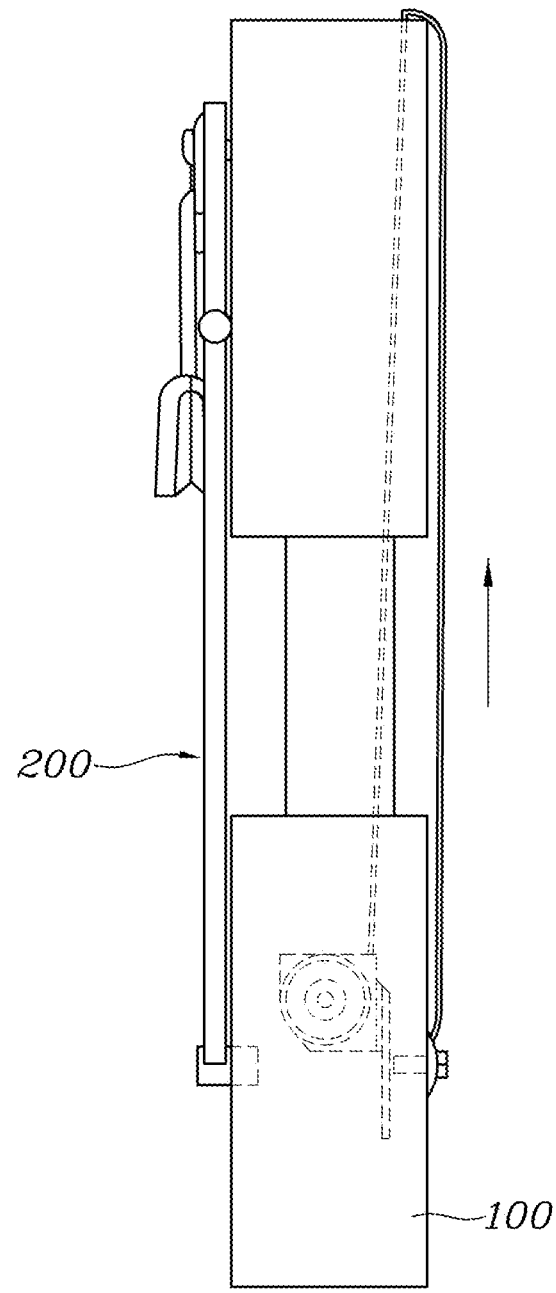
FIGS. 7 and 8 are diagrams for describing a structure of another embodiment in which a vertical length of the belt post is adjusted according to the present disclosure.
Figure 8:
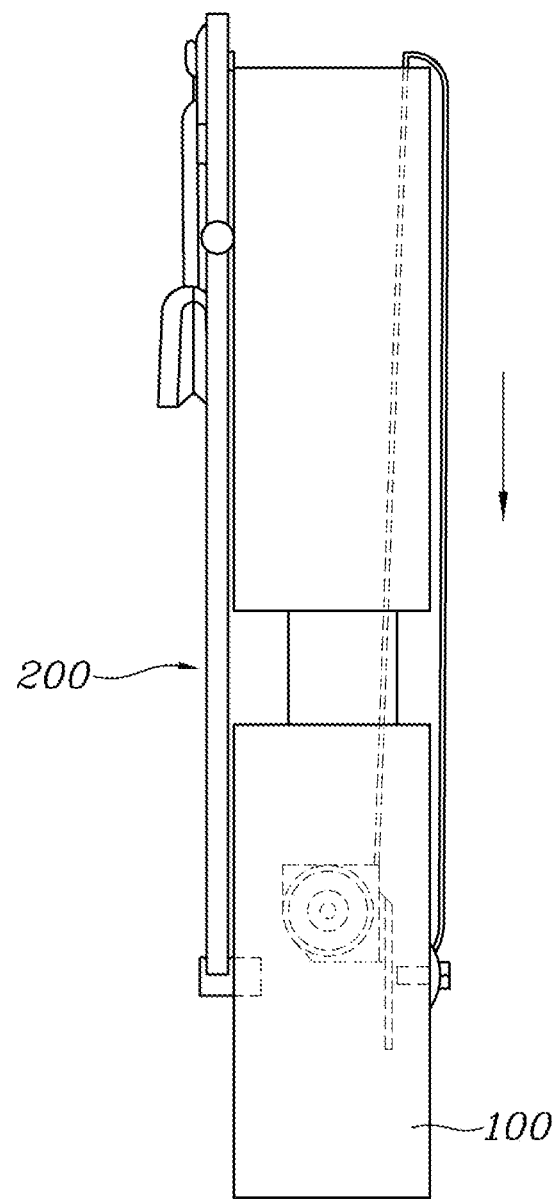

As another example, as shown in FIGS. 7 and 8, the upper portion of the belt post 100 may be vertically moved based on an intermediate portion of the belt post 100 so that the height of the belt post 100 may be adjusted.

In addition, in the present disclosure, a webbing outgoing hole 130 through which the webbing 110 enters and exits may be formed in the belt post 100, and the webbing outgoing hole 130 may be rotated based on an axis of the belt post 100.

Figure 4:
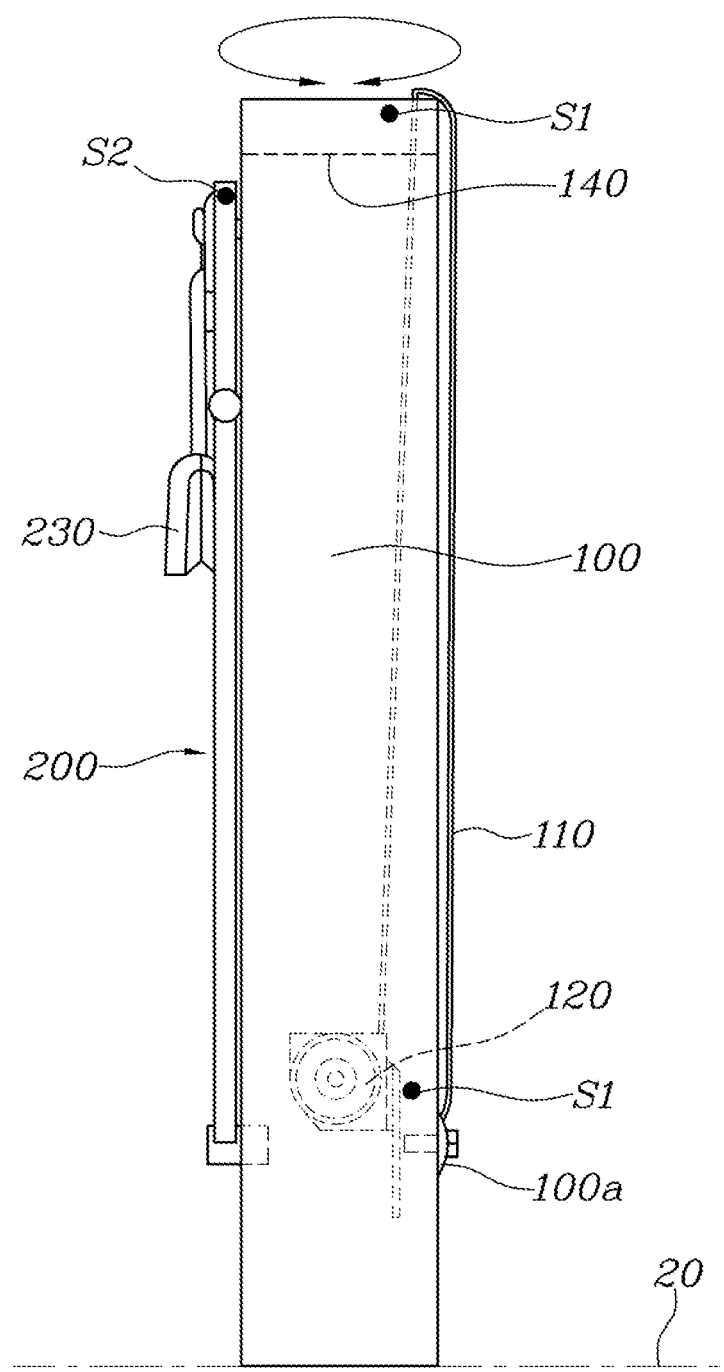
FIG. 4 is a diagram illustrating a position of a bearing installed on an upper end of the belt post according to the present disclosure.
Figure 9:
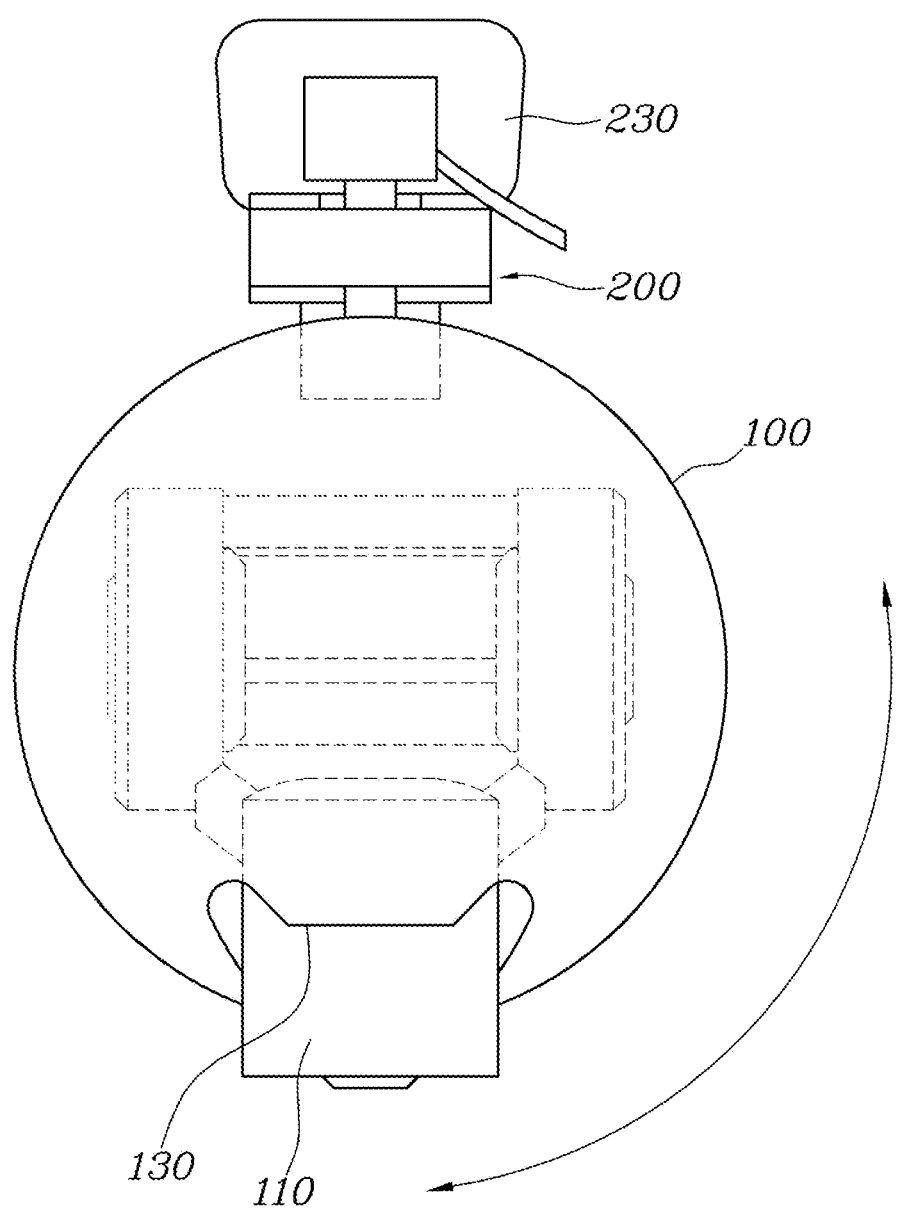
FIG. 9 is a diagram illustrating a structure in which the buckle post is connected to an inside of the belt post according to the present disclosure.

Referring to FIGS. 4 and 9, the webbing outgoing hole 130 is formed on the upper end of the belt post 100, and a bearing 140 or a rotary joint structure is provided in the belt post 100 positioned directly below the webbing outgoing hole 130 so that the webbing outgoing hole 130 may be rotated based on the axis of belt post 100.

Therefore, when the webbing 110 of the seat belt enters and exits from the webbing outgoing hole 130, a frictional force of the webbing 110 is minimized to facilitate the incoming and outgoing of the webbing 110.

In addition, in the present disclosure, the buckle post 200 may be mounted on an outer surface of the belt post 100.

That is, as shown in FIG. 4, in a structure in which the belt post 100 is formed in a cylindrical shape, a lower end of the buckle post 200 may be coupled to a lower portion of an outer circumferential surface of the belt post 100 in a hinge structure.

Figure 10:
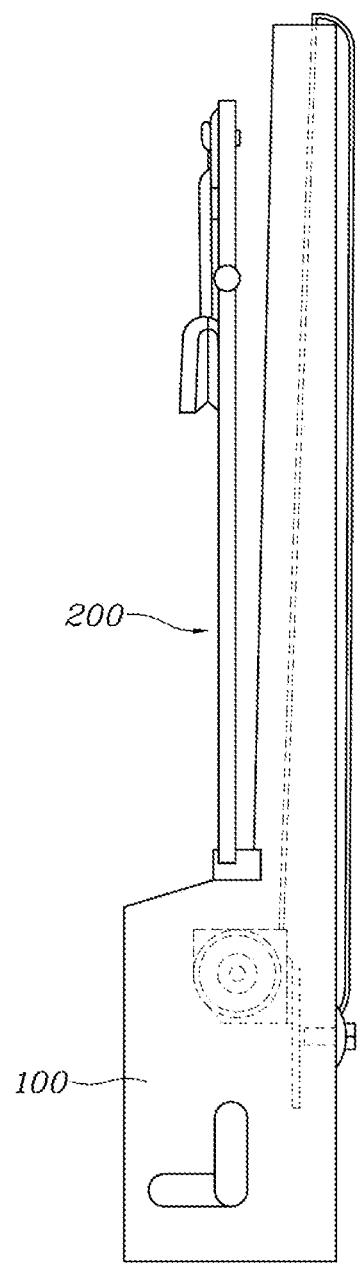
FIG. 10 is a diagram for describing an operation in which a webbing outgoing hole is rotated the according to the present disclosure.

In addition, as shown in FIG. 10, even when the upper portion of the belt post 100 is partially cut, the lower end of the buckle post 200 may be coupled to the outer surface of the belt post 100 in a hinge structure.

Continuously, as another embodiment in which the buckle post 200 is coupled, an accommodation hole 150 is formed on the side surface of the belt post 100, and the buckle post 200 is mounted on an inner surface of the accommodation hole 150 so that the buckle post 200 may be accommodated in the accommodation hole 150.

Figure 11:
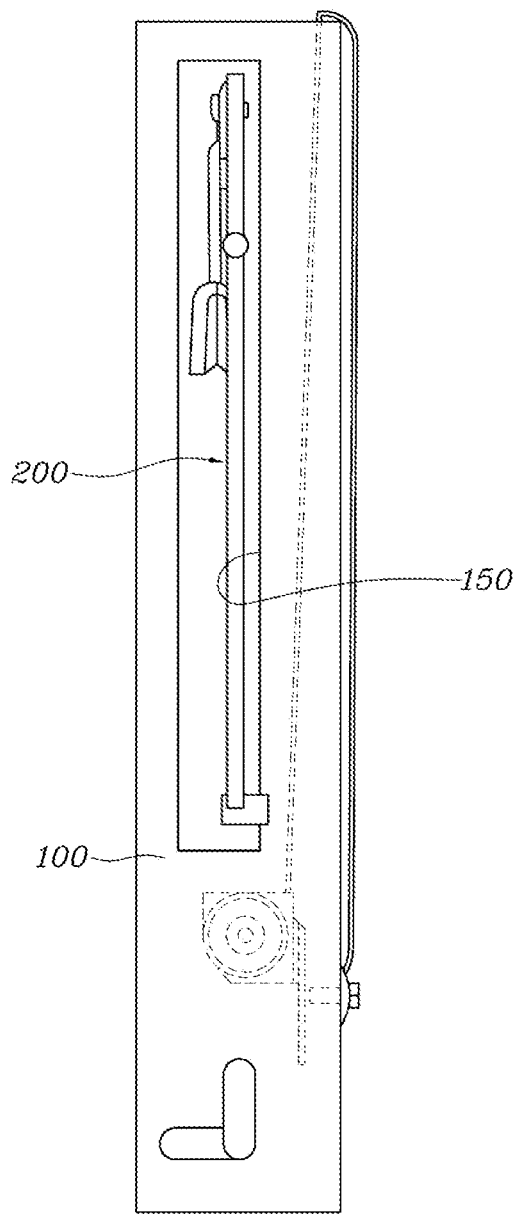
FIG. 11 is a diagram illustrating a structure in which the upper end of the belt post is formed in a cut shape and the buckle post is connected according to the present disclosure.
Figure 12:
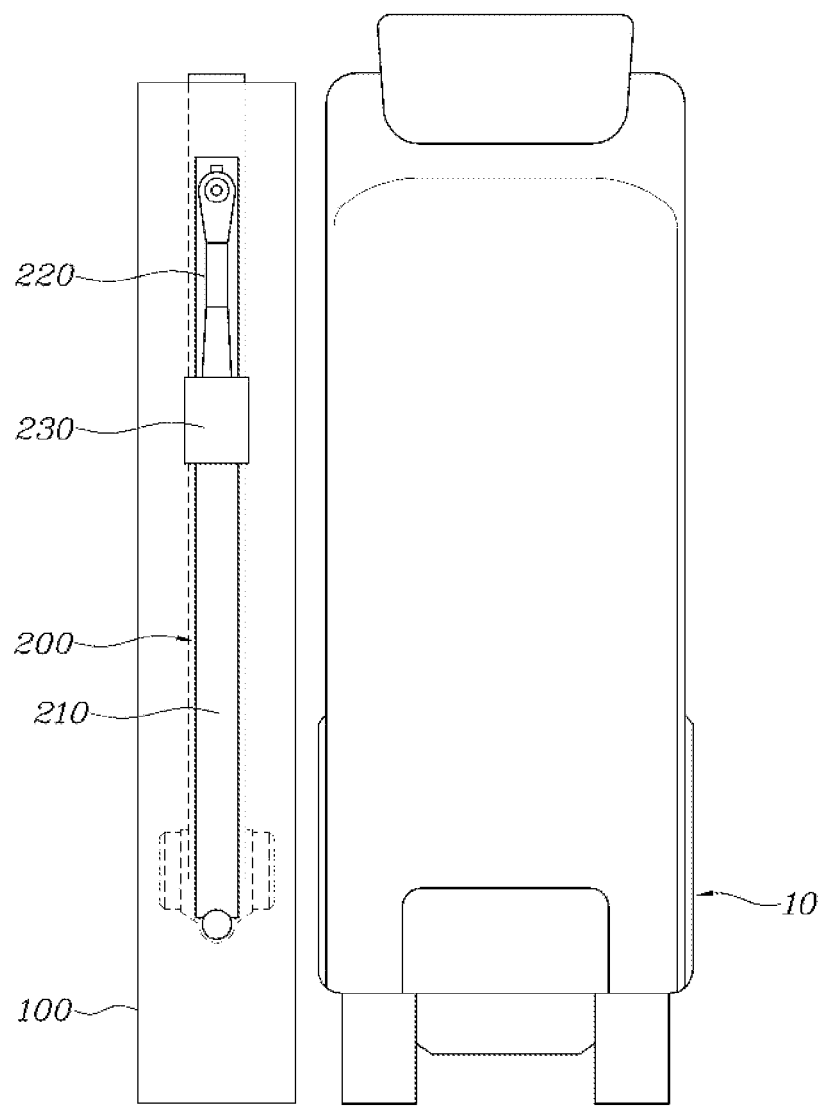
FIGS. 12 and 13 are diagrams illustrating an operation in which a first arm is rotated from one side to the other side of the seat according to the present disclosure.
Figure 13:
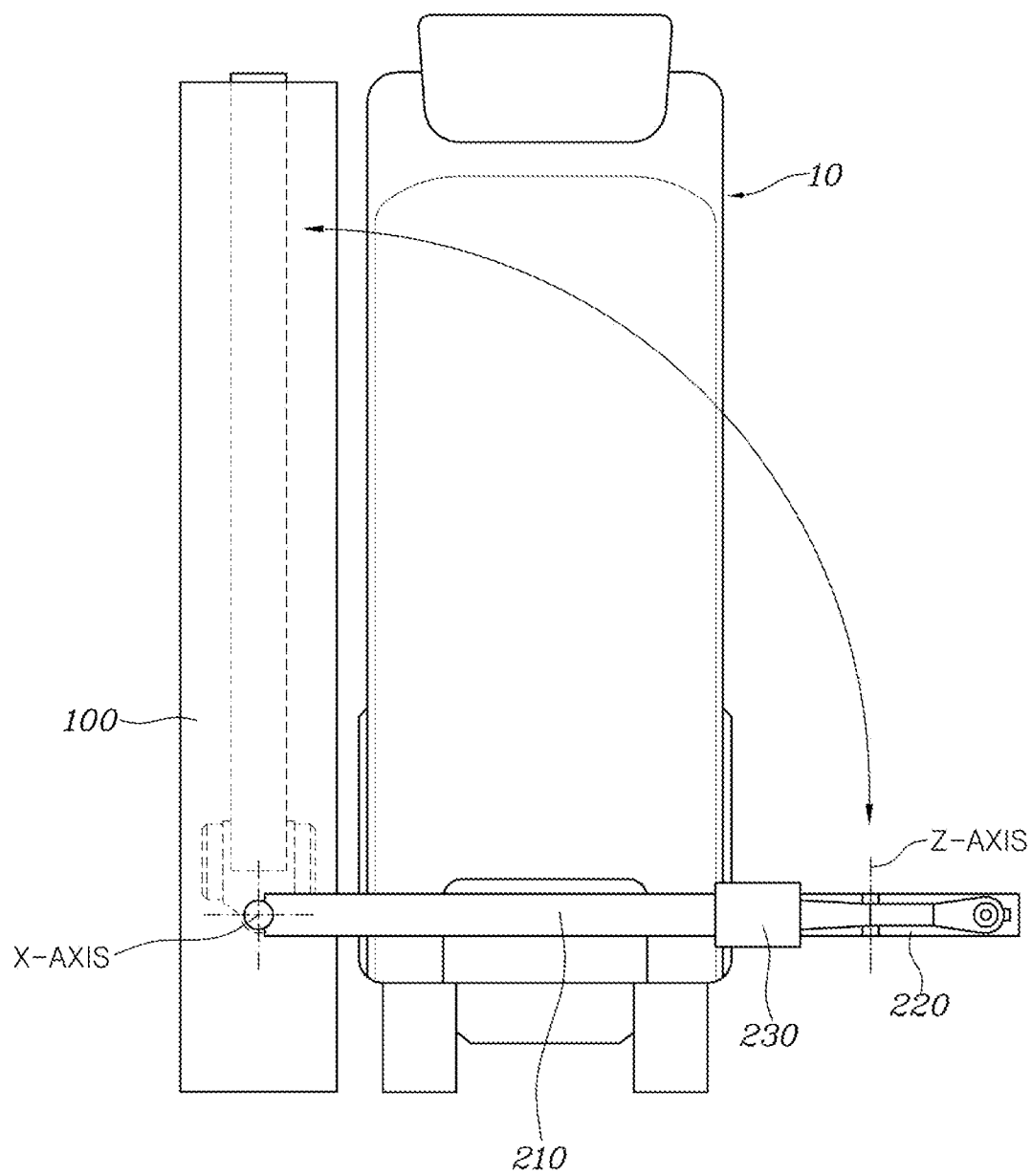
Figure 14:
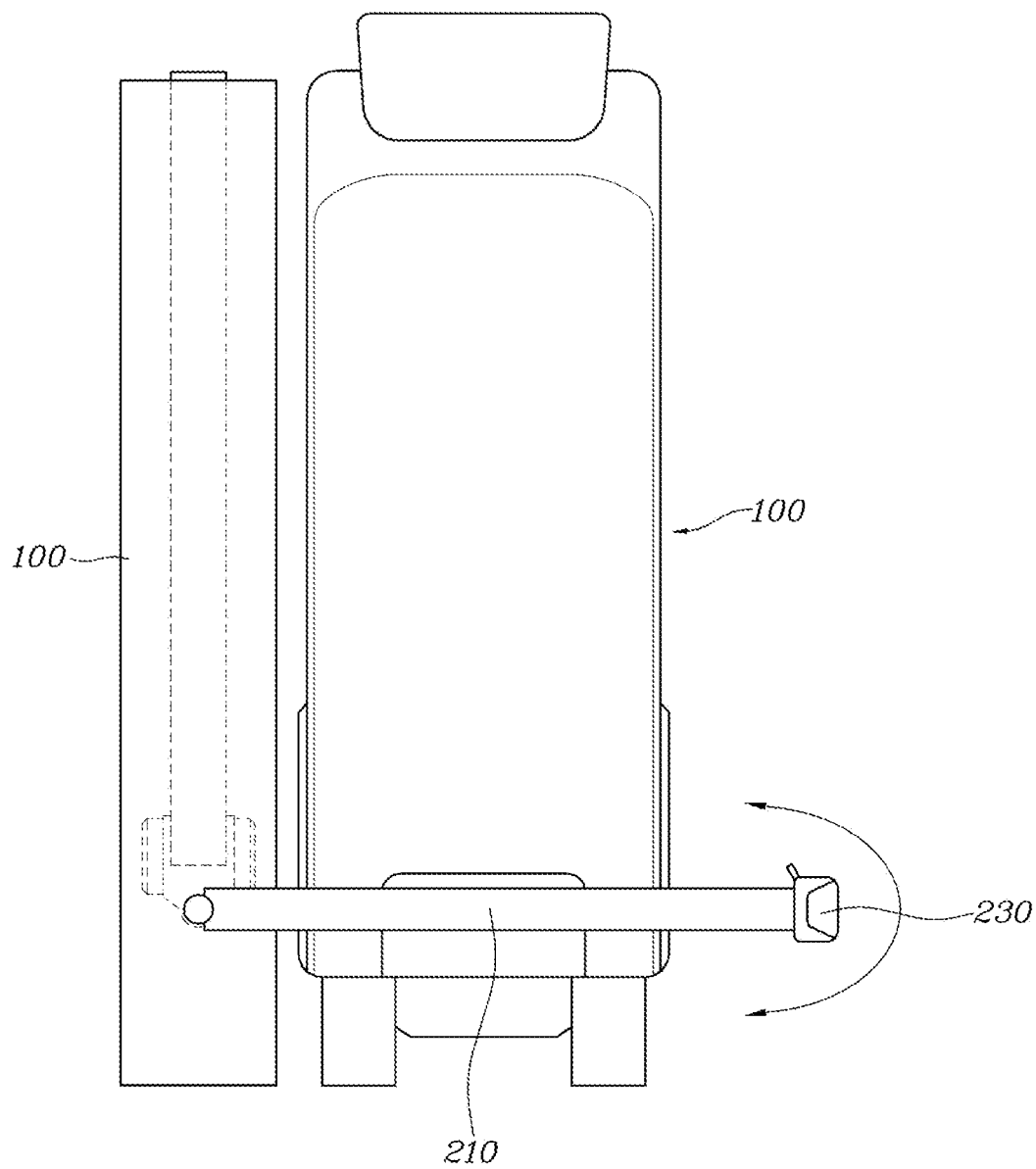
FIG. 14 is a diagram illustrating a state in which a second arm is rotated to a front side of the seat in FIG. 13.

To describe with reference to FIG. 11, the accommodation hole 150 is formed in a shape that is greater than a length in a width direction of the buckle post 200 along a vertical lengthwise direction of the belt post 100.

In addition, the lower end of the buckle post 200 is coupled to an inner surface of a lower end of the accommodation hole 150 in a hinge structure so that the buckle post 200 may be accommodated in the accommodation hole 150.

That is, the buckle post 200 may be folded to be accommodated in the accommodation hole 150, and when the buckle post 200 is used, the buckle post 200 may be rotated and unfolded to the outside of the accommodation hole 150.

Meanwhile, in the present disclosure, the buckle post 200 may be folded into a shape in which the arm overlaps in the lengthwise direction of the belt post 100 and may be folded into a shape in which the buckle 230 overlaps along a lengthwise direction of the arm.

Referring to FIGS. 1 to 3, before the buckle post 200 is unfolded from the belt post 100, the plurality of arms constituting the buckle post 200 are folded into an overlapping shape from the lower portion of the belt post 100 toward the upper portion thereof based on a state in which the belt post 100 is mounted, and the buckle 230 coupled to an end portion of the arm is folded into an overlapping shape from an upper portion of the arm toward a lower portion thereof.

In this way, in a state in which the seat belt device is not unfolded, the buckle post 200 is folded into a shape that overlaps the belt post 100 so that a size of the seat belt device may be reduced and accommodated easily.

For reference, the buckle post 200 may be provided with a fail-safe locking structure that may be unfolded only when the belt post 100 is mounted.

For example, the fail-safe locking structure may be operated to automatically release locking mechanically in conjunction with the mounting of the belt post 100 or may be operated to release the locking through the controller C which determines whether the belt post 100 is mounted.

In addition, in the present disclosure, the buckle post 200 includes a first arm 210 having one end connected to the belt post 100 in a hinge structure and the other end rotated and unfolded toward one side of the seat 10, a second arm 220 having one end connected to the other end of the first arm 210 in a hinge structure and the other end rotated and unfolded toward a front side of the seat 10, and the buckle 230 having one end connected to the other end of the second arm 220 in a hinge structure and the other end rotated and unfolded toward an upper portion of the seat 10.

The first arm 210 is rotated and unfolded around an X-axis, the second arm 220 is rotated and unfolded around a Z-axis, and the buckle 230 rotates with respect to the second arm 220 around a Y-axis.

To describe with reference to FIGS. 12 to 15, one end of the first arm 210 is connected to the lower portion of the belt post 100 in a hinge structure, and an axial direction of the hinge structure is the X-axis that is a front-rear direction of the vehicle.

Thus, the other end of the first arm 210 is rotated from a rear side of the seat 10 to the other side of the seat 10 and unfolded around the X-axis.

In addition, in a state in which the first arm 210 is unfolded, one end of the second arm 220 is connected to the other end of the first arm 210 in a hinge structure, and an axial direction of the hinge structure is the Z-axis that is a vertical direction of the vehicle.

Thus, in the state in which the first arm 210 is unfolded, the other end of the second arm 220 is rotated from the other side of the seat 10 toward the front side and unfolded around the Z-axis.

As described above, a structure in which the rotated first arm 210 is locked at a predetermined position may be provided, and when strength reinforcement of the locked state is required, the position of the first arm 210 may be fixed using a fixation mechanism which will be described below.

In addition, in a state in which the second arm 220 is unfolded, one end of the buckle 230 is connected to the other end of the second arm 220 in a hinge structure, and an axial direction of the hinge structure is the Y-axis that is the left-right direction of the vehicle.

Thus, in the state in which the second arm 220 is unfolded, the other end of the buckle 230 is rotated from the front side toward the upper portion of the seat 10 around the Y-axis.

Therefore, the buckle 230 is positioned on the other side of the seat 10 according to a joint rotation of the buckle post 200 so that the webbing 110 is pulled from one side of the seat 10 toward the buckle 230 and fastened to the buckle 230 so that the seat belt may be worn.

For reference, a manual method in which rotation operations are manually performed or an automatic method using a driving force of a motor may be applied to the rotation operations of the first arm 210 and the second arm 220.

In addition, in the present disclosure, at least one of the first arm 210 and the second arm 220 may be formed to be adjusted in length in the lengthwise direction.

Figure 20:
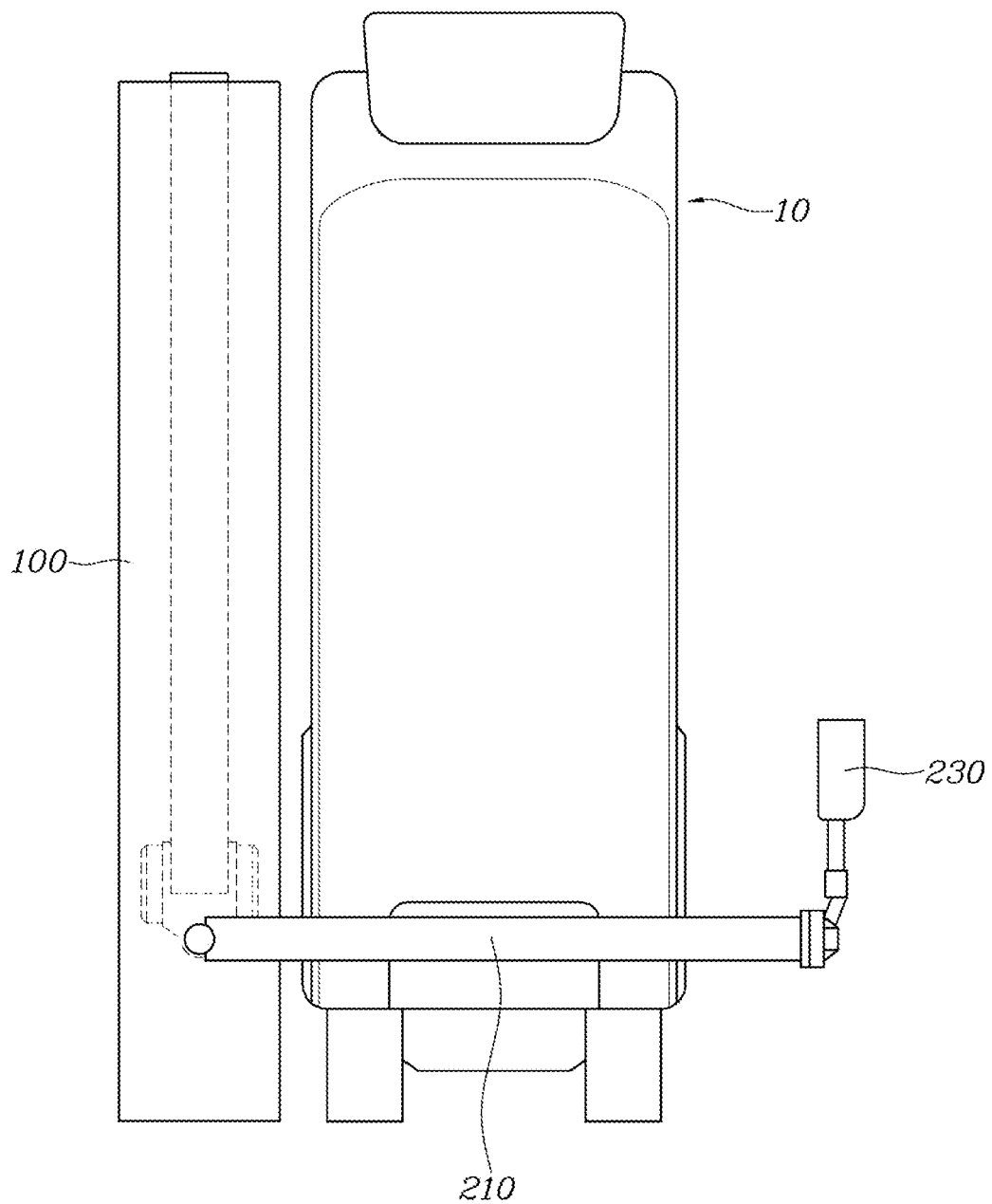
FIGS. 20 and 21 are diagrams illustrating an operation of adjusting left and right lengths of the first arm according to the present disclosure.
Figure 21:
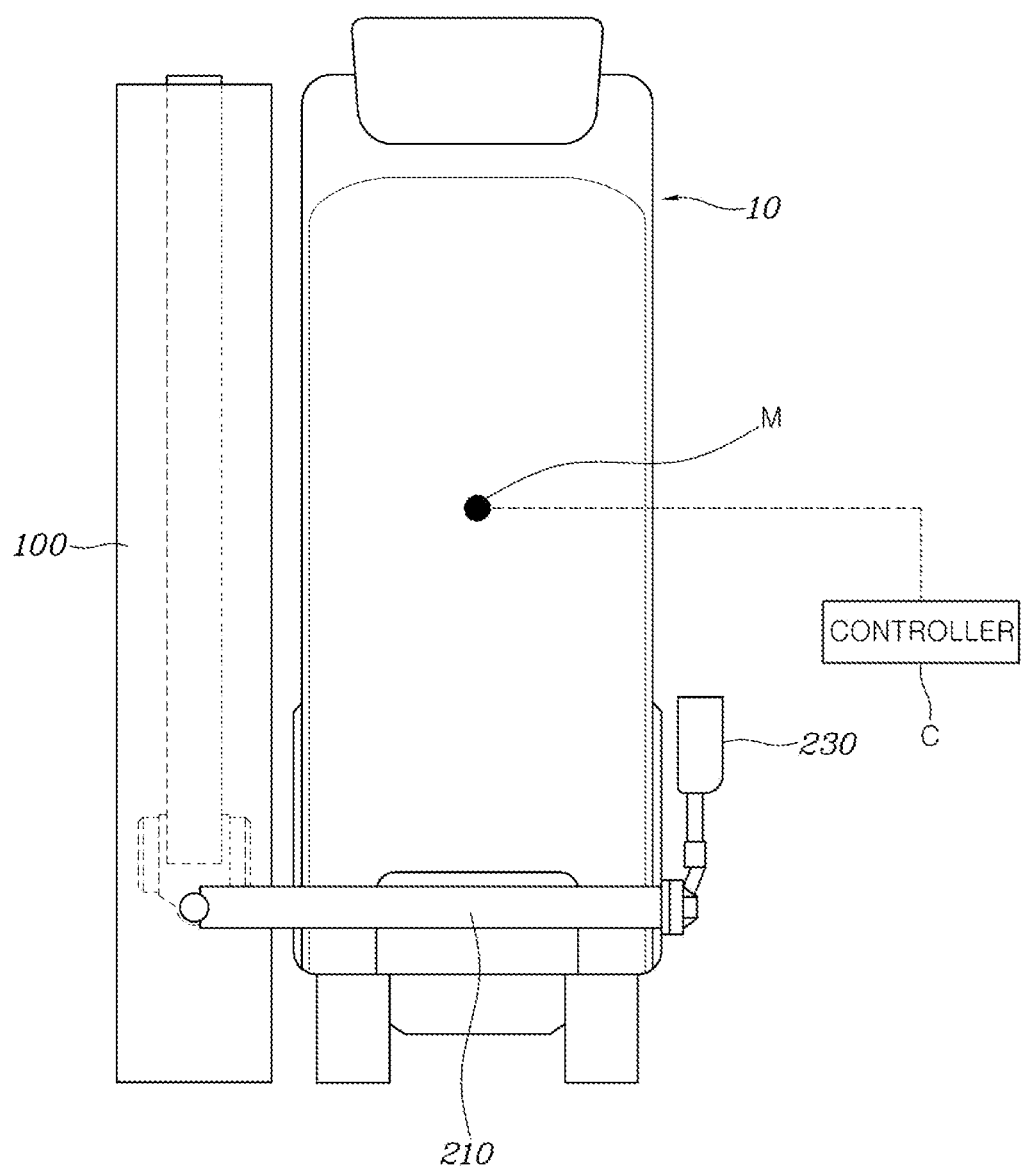

That is, as shown in FIGS. 20 and 21, since a length of the first arm 210 may be extended or shortened in a left-right lengthwise direction, left and right positions of the buckle 230 positioned on the other side of the seat 10 may be adjusted to respond to various lengths of the seat 10 in the width direction.

Figure 15:
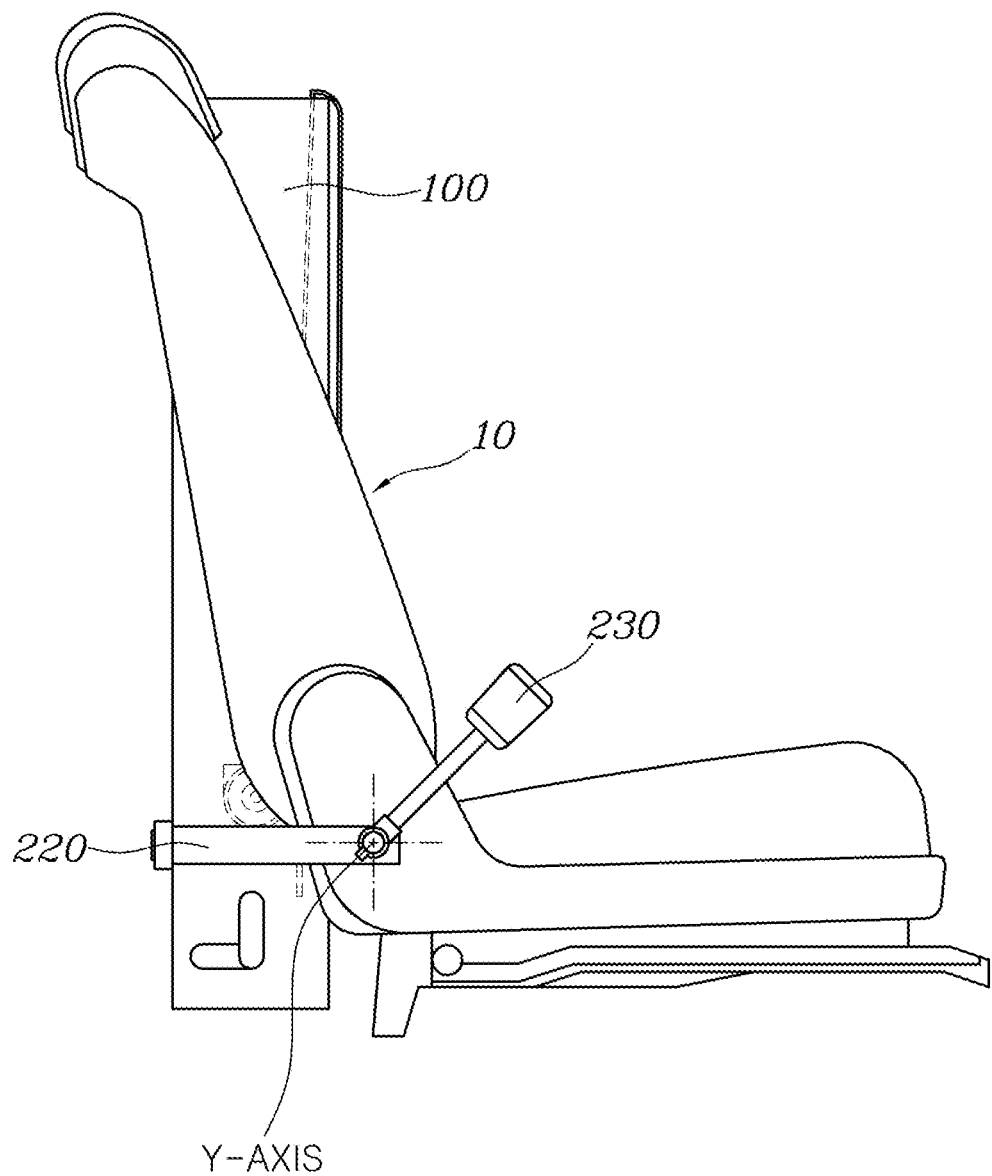
FIG. 15 is a diagram illustrating a state in which a buckle is rotated upward in FIG. 14.
Figure 22:
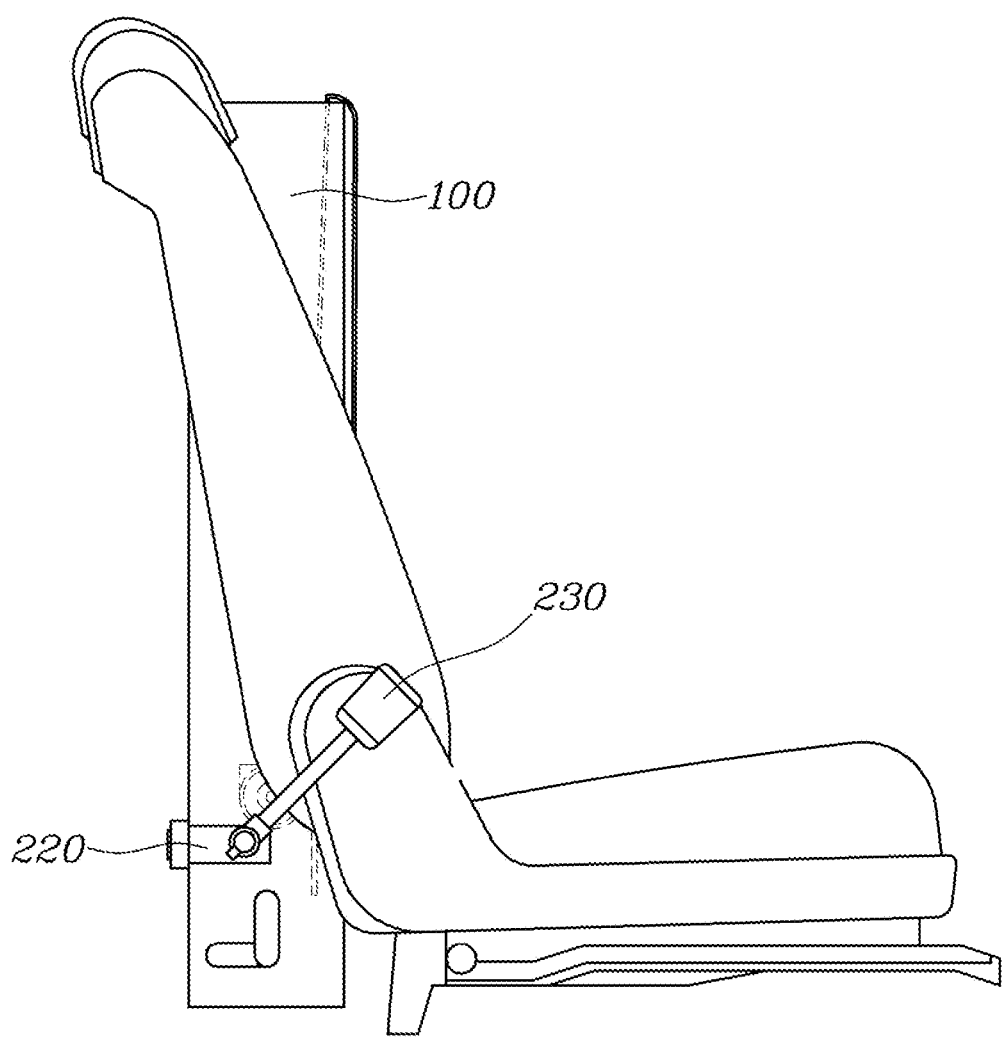
FIG. 22 is a diagram illustrating a state in which a length of the second arm is adjusted to be short according to the present disclosure.

In addition, as shown in FIGS. 15 and 22, since a length of the second arm 220 may be extended or shortened in a front-rear lengthwise direction, front and rear positions of the buckle 230 positioned on the other side of the seat 10 may be adjusted to respond to various lengths of the seat 10 in the front-rear direction.

In this case, a method of adjusting the lengths of the first arm 210 and the second arm 220 may have the same structure as the method of adjusting the height of the belt post 100.

Meanwhile, in the present disclosure, the first arm 210 may be fixed and maintained in the unfolded state by being coupled by the fixation mechanism provided on the seat 10 or the floor part 20.

As one example of the fixation mechanism, the fixation mechanism may be a latch 241 which is caught on an upper or lower surface of the first arm 210 through a rotation.

Figure 16:
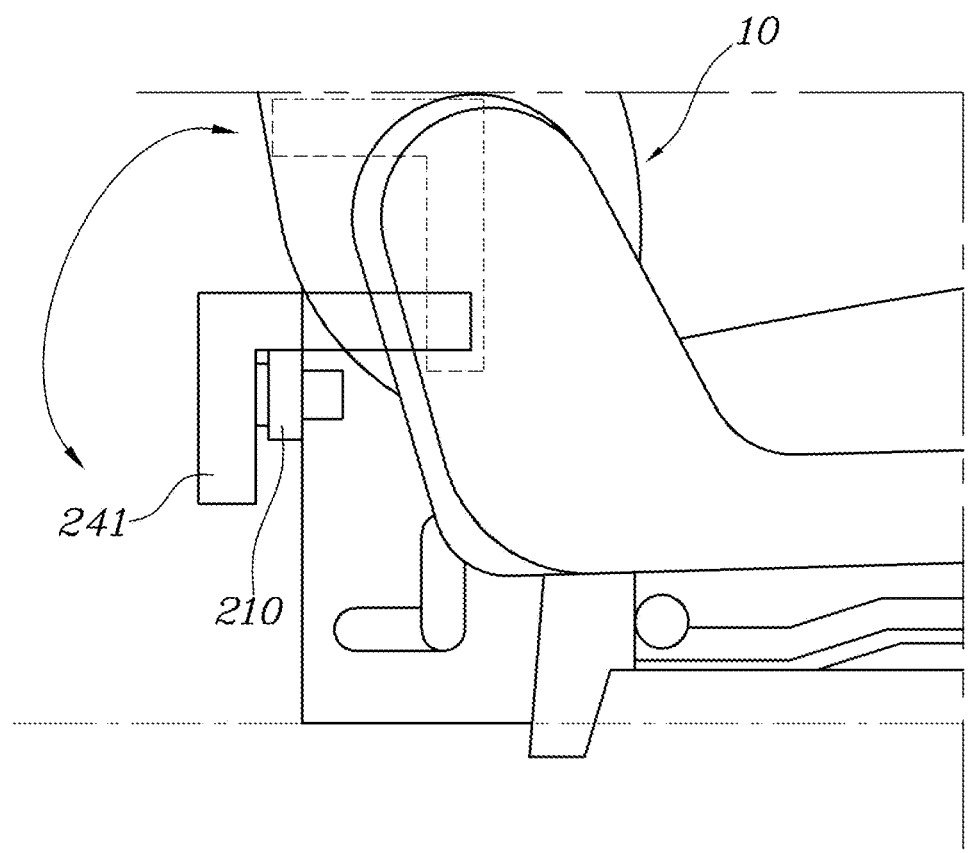
FIGS. 16 and 17 are diagrams for describing a structure and an operation of an embodiment of a latch for fixing the first arm according to the present disclosure.

For example, as shown in FIG. 16, the latch 241 with teeth formed on an inner surface thereof is formed in an "L" shape, and one end of the latch 241 is rotatably coupled to a seat cushion.

Thus, the other end of the latch 241 is rotated toward the first arm 210 around one end of the latch 241 so that the latch 241 is caught in a shape in which the latch 241 covers the upper surface of the first arm 210. In this case, teeth of a shape engaged with a tooth shape of the latch 241 may be formed on the upper surface of the first arm 210, which is in contact with the inner surface of the latch 241.

Thus, a state in which the first arm 210 is unfolded and locked may be fixed and maintained more robustly.

Figure 17:
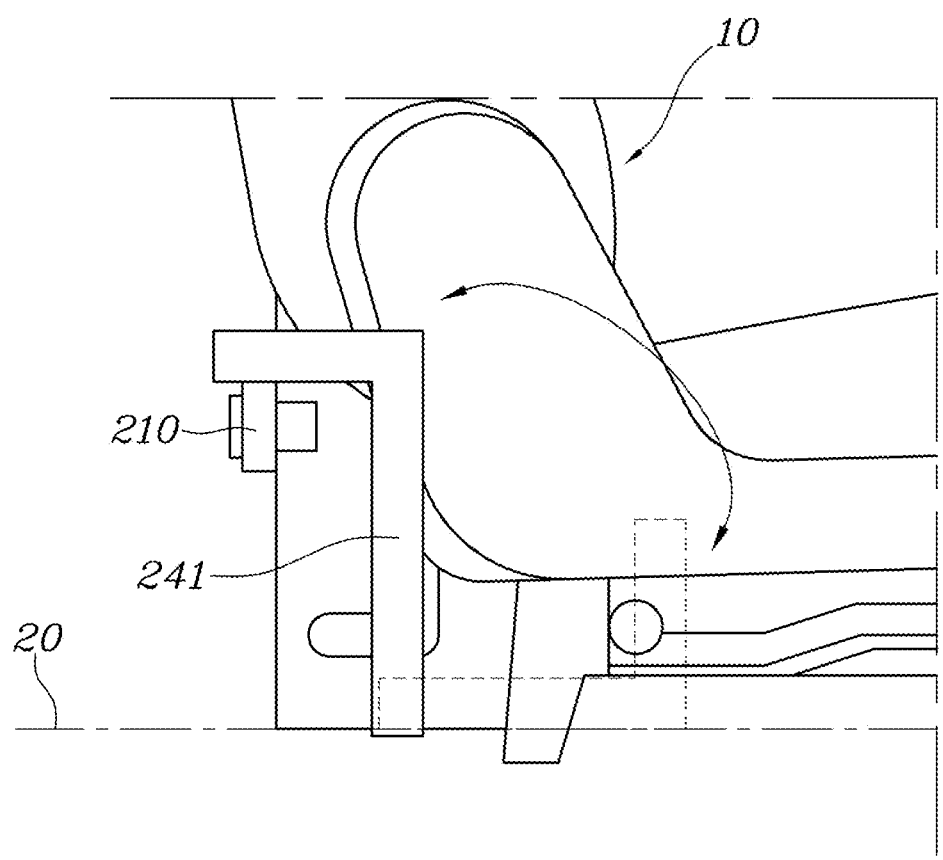

Alternatively, as shown in FIG. 17, one end of the latch 241 may be rotatably coupled to a floor, and even in this structure, the latch 241 may be rotated and fixed in a shape covering the first arm 210.

As another example of the fixation mechanism, the fixation mechanism may be a slide locker 242 which is inserted into and caught to the first arm 210 through a sliding movement.

Figure 18:
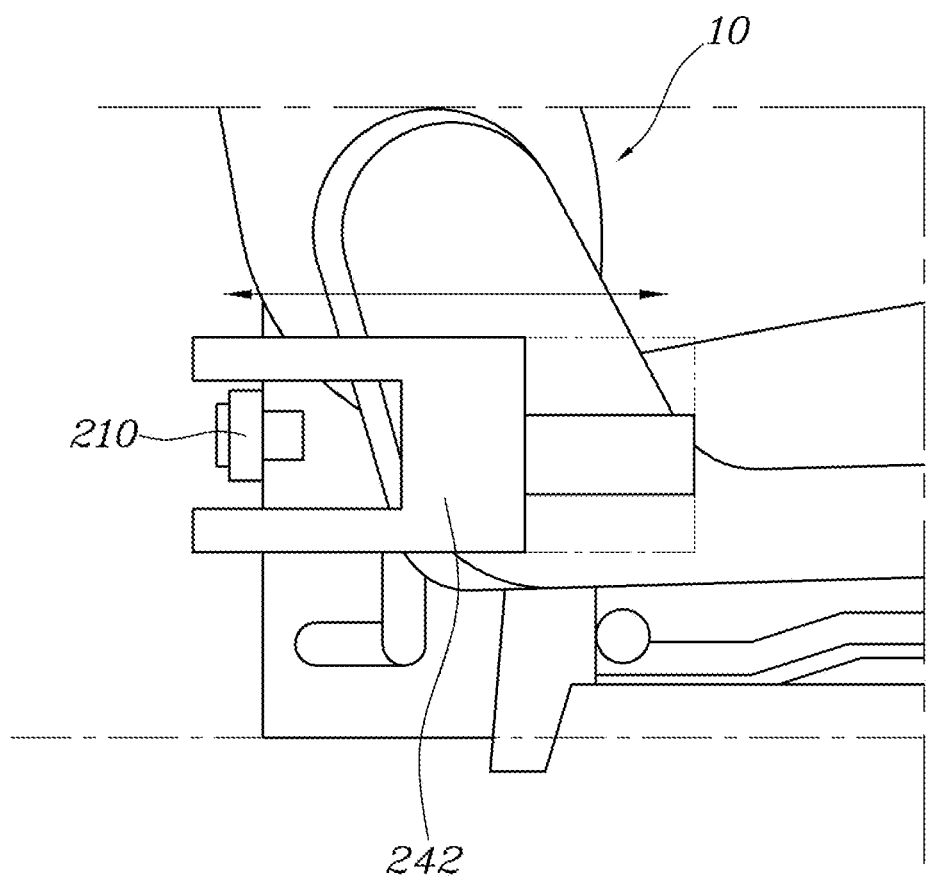
FIGS. 18 and 19 are diagrams for describing a structure and an operation of an embodiment of a slide locker for fixing the first arm according to the present disclosure.

For example, as shown in FIG. 18, a front end of the slide locker 242 is fixed to the seat cushion, and a locking groove is formed at a rear end of the slide locker 242 so that the rear end may slide toward the rear side.

Thus, the other end of the slide locker 242 is moved toward the first arm 210 based on one end of the slide locker 242 so that the first arm 210 is inserted into and caught to the locking groove.

Thus, a state in which the first arm 210 is unfolded and locked may be fixed and maintained more robustly.

Figure 19:
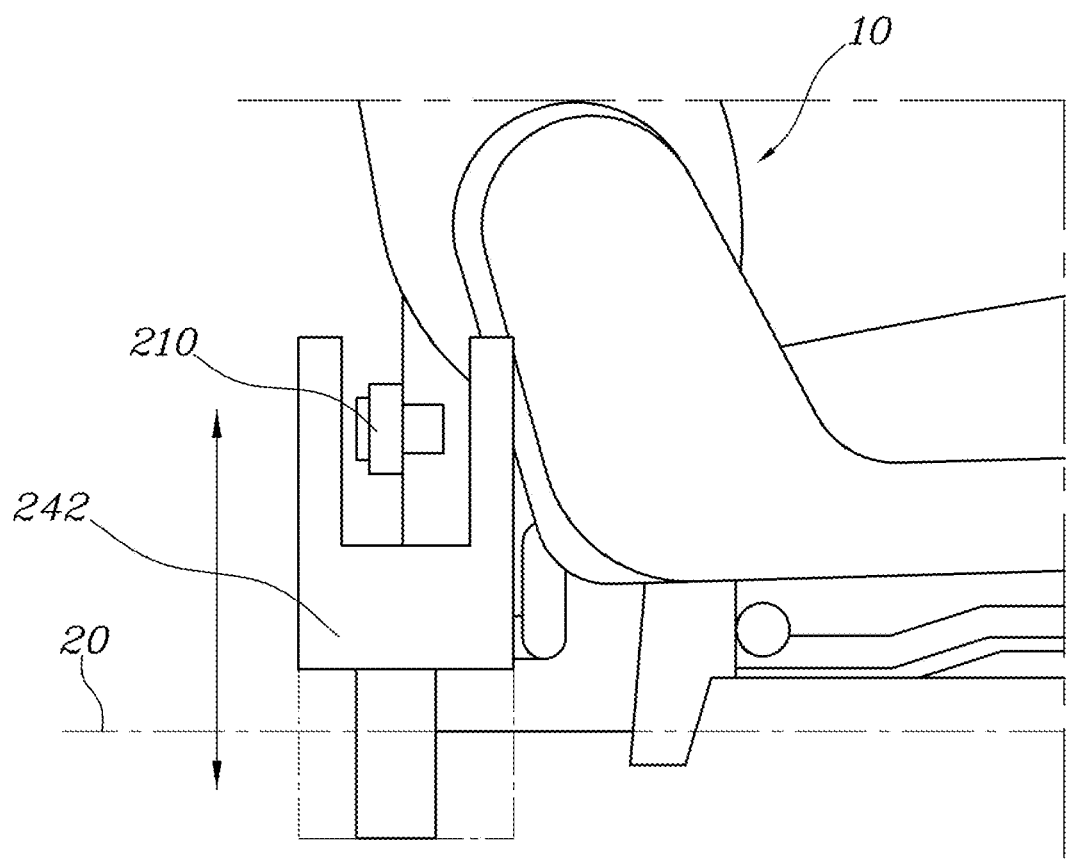

Alternatively, as shown in FIG. 19, a lower end of the slide locker may be coupled to the floor, and even in this structure, an upper end of the slide locker may be moved to the front side so that the first arm 210 is inserted and caught.

Meanwhile, in the present disclosure, the belt post 100 may be mounted on a seat frame 11 which is moved together with the seat 10.

Figure 23:
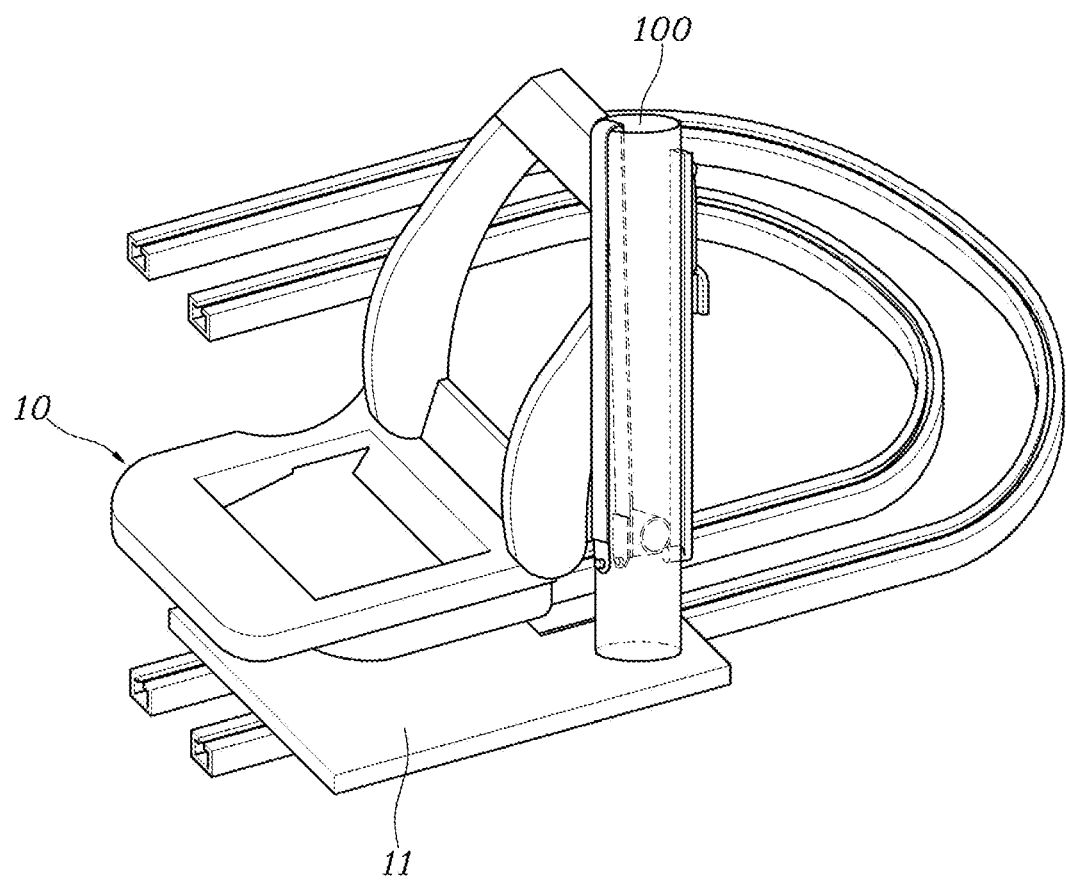
FIG. 23 is a diagram illustrating a structure in which the belt post is mounted on a seat frame according to the present disclosure.

To describe with reference to FIG. 23, when the strength of the seat 10 is secured, a structure capable of fixing the belt post 100 to the seat frame 11 fixed to the lower end of the seat 10 is provided.

Thus, when the seat 10 is moved along a seat movement path provided in the floor part 20, the seat belt device is moved together with the seat 10, and the seat belt device is rotated together with a swivel rotation of the seat 10 so that convenience of use of the seat belt device can be improved.

For reference, the frame on which the lower end portion of the belt post 100 is mounted may be formed integrally with the seat frame 11 fixed to the seat 10 and, alternatively, the frame may be provided separately to be coupled to the seat frame 11. Thus, when the seat belt device is attached or detached, the frame on which the seat belt device is mounted may reduce a volume of the seat 10 through rotation and folding operations.

Figure 24:
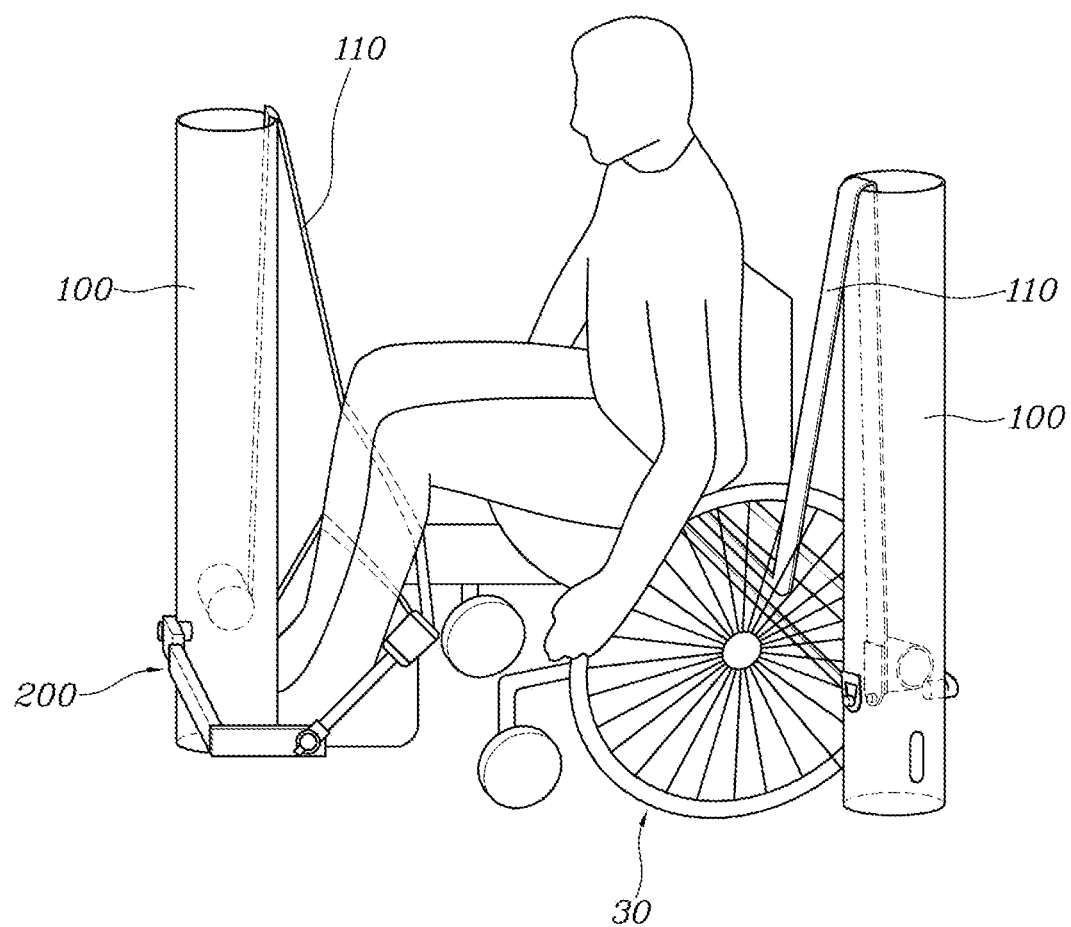
FIGS. 24 and 25 are diagrams illustrating a state in which the seat belt device according to the present disclosure is used to fix a wheelchair.

In addition, as shown in FIG. 24, the seat belt device of the present disclosure is installed on each of one front side of a wheelchair 30 and the other rear side of the wheelchair 30 and may fix the wheelchair 30 in the same manner as fixing a CRS (child restraint system).

Figure 25:
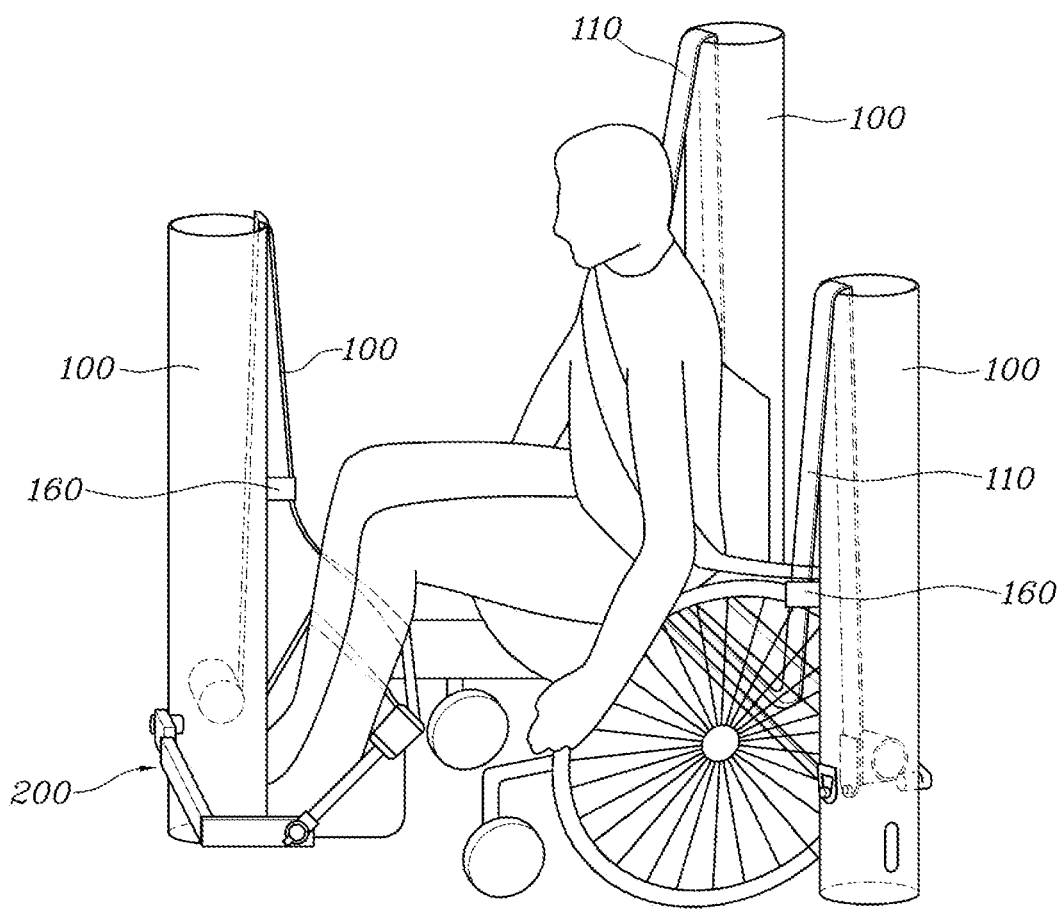

In addition, as shown in FIG. 25, a fixing ring 160 is provided on the side surface of the belt post 100 and formed to allow the webbing 110 to pass therethrough so that the wheelchair 30 may be fixed more firmly.

In addition, a seat belt device for the passenger to wear may be added to the other rear side of the wheelchair 30 so that a passenger riding in the wheelchair 30 may wear the seat belt.

Therefore, since the wheelchair 30 may be simply fixed instead of the complicated and cumbersome installation method using the seat belt, it may be used as a seat belt device for 탑승 transportation disabled people without special modification.

Meanwhile, according to the present disclosure, whether the belt post 100 and the buckle post 200 communicate with the seat 10 in a wireless manner within a range specified by regulations may be determined, and the belt post 100 and the buckle post 200 may be guided to be mounted normally.

To this end, the present disclosure includes a first slave sensor S1 installed at a designated position of the belt post 100, a second slave sensor S2 installed at a designated position of the buckle post 200, a master sensor M installed at the seat 10 and configured to detect the positions of the first and second slave sensors through communication with the first and second slave sensors, and a controller C configured to determine whether the positions of the first and second slave sensors detected through the master sensor M are within a normal installation area and determine whether the belt post 100 and the buckle post 200 are installed normally.

Specifically, the designated position of the belt post 100 and the designated position of the buckle post 200 may be positioned within a regulated domain of a seat belt anchorage.

Figure 26:
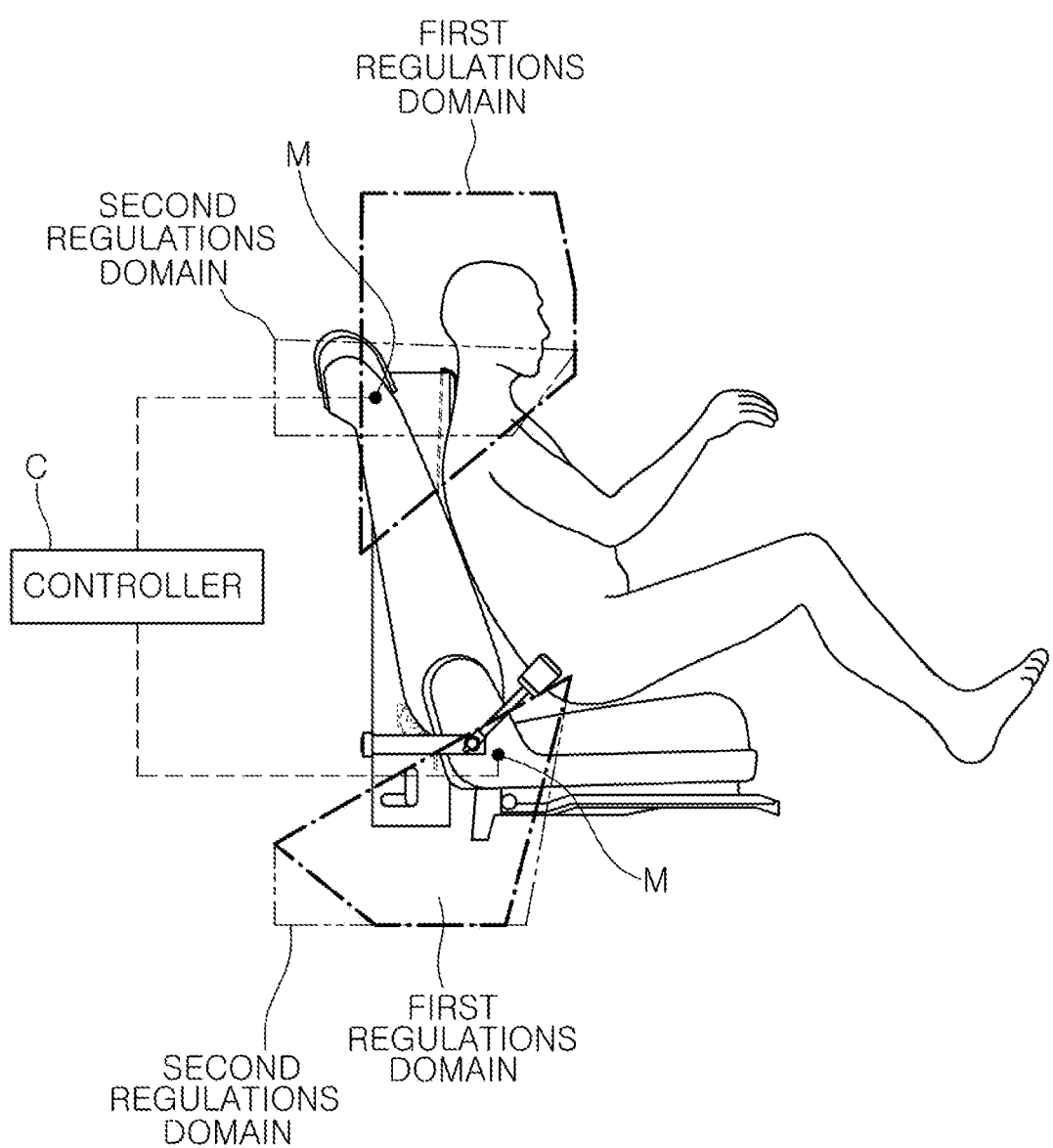
FIG. 26 is a diagram illustrating regulations domains in which a lower anchor and an upper anchor of the seat belt device should be detected according to the present disclosure.

FIG. 26 shows a regulations domain (first regulations domain) in Korea and North America, and a regulations domain (second regulations domain) in Europe, and the first slave sensor S1 and the second slave sensor S2 are installed in the regulated domain.

The first slave sensor S1 and the second slave sensor S2 are sensors capable of transmitting and receiving, the first slave sensor S1 may be installed around an outside lower anchor of the belt post 100 where the retractor 120 is positioned and around an outside upper anchor of the belt post 100 where the webbing 110 exits.

The second slave sensor S2 may be installed around an inside lower anchor of the buckle post 200 where the buckle 230 is positioned.

The master sensor M is also a sensor capable of transmitting and receiving, and when the first and second slave sensors and advertising-type radio frequency (RF) communication, such as Bluetooth low energy (BLE)/wireless fidelity (WiFi), are used, the master sensor M may be installed by selecting an optimal position capable of measuring directionality and a distance to distinguish between an inside and an outside of the regulations domain.

As one example, the master sensor M may be installed in the center of the rear side of the seat as shown in FIG. 21.

However, when the master sensor M and the first slave sensor S1 and the second slave sensor S2 use a contact or near-field communication method, as shown in FIG. 26, the master sensor M may be installed at each of an upper end of the seat back and a rear end of the seat cushion adjacent to the first slave sensor S1 and the second slave sensor S2.

The installed master sensor M as described above communicates with the first slave sensor S1 and the second slave sensor S2 in a wireless manner and transmits received information to the controller C.

For reference, power of the master sensor M and each slave sensor may be directly supplied or charged through a built-in battery or a part coupled to the floor part 20 (roof part).

In addition, a method such as an RF method, which may overcome a distance in other ways, may be arranged according to an example of a sensor position which will be described in detail below.

For example, a contact method may use a contact method of a transceiver, and when light or radar is used, communication may be performed by setting a light emission range of a transceiver of the sensor.

In addition, in the case of the RF method, it is possible to perform measurement without restrictions on a position of the transceiver by setting a signal strength value or a responding time, and it is possible to determine whether normal installation fails (NG) by weakening a signal strength outside an area set through antenna design.

That is, by using the seat 10 and wireless communication, it is possible to provide a fail-safe function for various regulations and various automated control functions.

Meanwhile, a method of mounting a seat belt device of the present disclosure includes, when the belt post 100 is mounted on one side of the seat 10, a first position detection operation of detecting, by the master sensor M installed on the seat 10, a position of the first slave sensor S1 installed at a designated position of the belt post 100; a first position determination operation of determining, by the controller C, whether the position of the first slave sensor S1 is within a normal installation area and determining whether the belt post 100 is installed normally; when it is determined that the belt post 100 is installed normally, a buckle rotation operation of rotating a multi-joint structure of the buckle post 200 to position the buckle 230 on the other side of the seat 10; when the buckle post 200 is positioned on the other side of the seat 10, a second position detection operation of detecting, by the master sensor M, a position of the second slave sensor S2 installed at a designated position of the buckle post 200; and a second position determination operation of determining, by the controller C, whether the position of the second slave sensor S2 is within a normal installation area and determining whether the belt post 100 is installed normally.

When it is determined that the belt post 100 is installed normally in the first position determination operation, a message related to an operation of moving the buckle post 200 may be provided.

When it is determined that the belt post 100 is installed abnormally in the first position determination operation, a message related to incorrect installation of the belt post 100 and a message instructing re-installation of the belt post 100 may be provided.

When it is determined that the buckle post 200 is installed abnormally in the second position determination operation, a message inducing an adjustment of the position of the buckle 230 may be provided.

Figure 27:
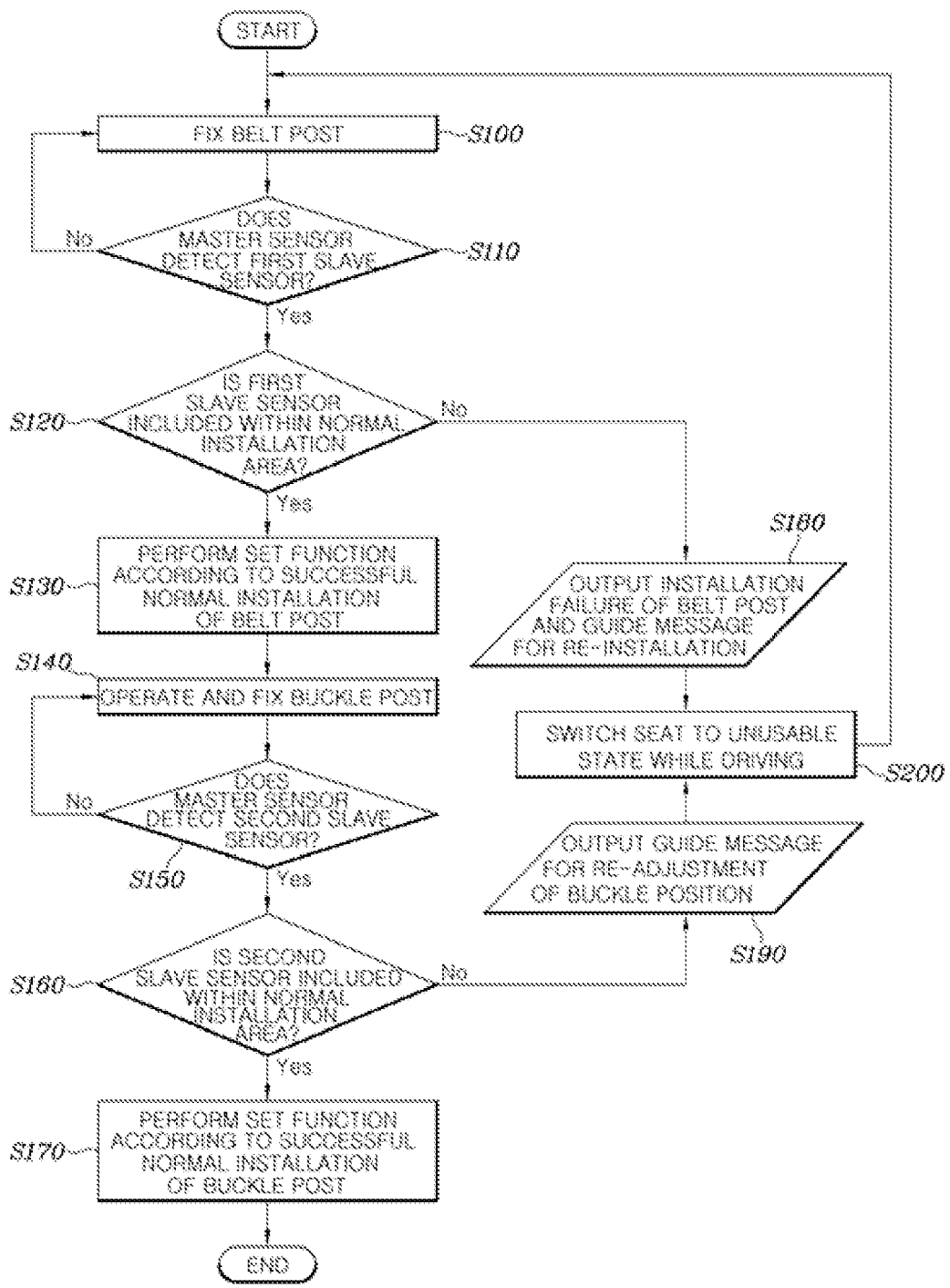
FIG. 27 is a flowchart for describing a method of mounting a seat belt device according to the present disclosure.

Hereinafter, a process of mounting the seat belt device of the present disclosure will be described with reference to FIG. 27.

The belt post 100 is fixed in the vehicle (S100).

Thus, it is determined whether the master sensor M detects the first slave sensor S1 installed on the belt post 100 (S110).

As the result of the determination in operation S110, when the first slave sensor S1 is detected, it is determined whether the first slave sensor S1 is installed within the normal installation area, that is, at a valid position in the regulations domain (S120).

As the result of the determination in operation S120, when it is determined that the first slave sensor S1 is installed within the normal installation area, a set function is performed according to successful normal installation of the belt post 100 (S130).

For example, a normal installation message for the belt post 100 may be transmitted to the passenger.

In addition, when the seat belt device is electrically operated, a guidance message to start an operation of the buckle post 200 may be transmitted.

In addition, a height of the belt post 100 may be raised to be greater than or equal to the lowest height of the upper anchorage.

However, when the seat belt device is manually operated, a message to guide the order to be performed subsequently may be transmitted.

The message transmission may be implemented through a speaker, a light bulb, or a display embedded in the belt post 100, or when a communication function with the vehicle is provided, a warning may be issued using a vehicle system.

Otherwise, as the result of the determination in operation S120, when it is determined that the first slave sensor S1 is not installed within the normal installation area, a set function is performed according to an installation failure of the belt post 100 (S180).

For example, by outputting a warning message, such as "the seat belt is not installed in a valid position, move to a correct position ○○○", visually or audibly, it is possible to induce and guide re-installation of the belt post 100 together with a 상착 failure situation of the belt post 100.

In addition, a warning that the belt post 100 is not fixed and the seat 10 is not fixed may be issued to induce recognition of a driving impossible state.

Meanwhile, after the set function according to the normal installation of the belt post 100 is performed in operation S130, the arm of the buckle post 200 and the buckle 230 are joint-rotated and fixed at a predetermined position (S140).

Thus, it is determined whether the master sensor M detects the second slave sensor S2 installed on the buckle post 200 (S150).

As the result of the determination in operation S150, when the second slave sensor S2 is detected, it is determined whether the second slave sensor S2 is installed within the normal installation area, that is, at a valid position in the regulations domain (S160).

As the result of the determination in operation S160, when it is determined that the second slave sensor S2 is installed within the normal installation area, a set function is performed according to successful normal installation of the belt post 200 (S170).

For example, a normal operation message for the belt post 200 may be transmitted to the passenger.

In addition, an operation of fixing the position of the buckle post 200 may be performed through the fixation mechanism.

The message transmission may be implemented through a speaker, a light bulb, or a display embedded in the buckle post 200, or when a communication function with the vehicle is provided, a warning may be issued using a vehicle system.

Otherwise, as the result of the determination in operation S160, when it is determined that the second slave sensor S2 is not installed within the normal installation area, a set function is performed according to an installation failure of the buckle post 200 (S190).

For example, it is possible to guide a position adjustment of the buckle 230 by outputting a visual or audible warning message such as "re-adjust buckle position."

In addition, a warning that the buckle post 200 is not fixed may be issued to induce recognition of a driving impossible state.

In this way, according to the present disclosure, the seat and the seat belt are separated, and thus the seat belt capable of being moved and installed independently is implemented so that functionality of the seat can be improved, a multi-purpose in using a vehicle can be possible through versatility of the seat, and when designing a seat frame to implement a function of the seat, it is possible to increase a degree of design freedom by being free from restrictions due to the seat belt.

In addition, since the seat belt is separated and one type of seat belt may respond to seat belt specifications of various vehicle types, there is an advantage in that it is possible to reduce a weight of the seat and to commonly use seat belts for all vehicle types so that material costs can be reduced and high marketability can be secured through various designs.

In addition, when the seat is removed, the seat belt can be removed together with the seat, and thus there is an effect in that the seat belt is not remained unnecessarily in the vehicle interior so that space utilization is improved.

Meanwhile, although the present disclosure has been described in detail with respect to only the above described specific examples, it is obvious to those skilled in the art that various modifications and alternations are possible within the technical scope of the present disclosure, and it is natural that such modifications and alternation fall within the appended claims.

What is claimed is:

1. A seat belt device for a vehicle, the seat belt device comprising:
   a belt post having a seat belt assembly, the belt post being mounted inside an interior of the vehicle, wherein a webbing of a seat belt is provided at one side of a seat, and
   a buckle post in which an arm and a buckle are connected to the belt post in a multi-joint structure, and the buckle is positioned on another side of the seat due to joint rotation of the arm and the buckle,
   wherein the belt post is formed in a vertical lengthwise direction and is mounted on at least one of a floor part or a roof part of the interior of the vehicle.

2. The seat belt device of claim 1, wherein the belt post is configured to be adjusted in height in the lengthwise direction.

3. The seat belt device of claim 1, wherein:
   a webbing outgoing hole through which a webbing enters and exits is formed in the belt post; and
   the webbing outgoing hole is rotated about an axis of the belt post.

4. The seat belt device of claim 1, wherein the buckle post is mounted on an outer surface of the belt post.

5. The seat belt device of claim 1, wherein an accommodation hole is formed on a side surface of the belt post, and the buckle post is mounted on an inner surface of the accommodation hole so that the buckle post is accommodated in the accommodation hole.

6. The seat belt device of claim 1, wherein the buckle post is folded in a shape in which the arm overlaps in a lengthwise direction of the belt post and folded in a shape in which the buckle overlaps in a lengthwise direction of the arm.

7. The seat belt device of claim 1, wherein the buckle post includes:
   a first arm having one end connected to the belt post in a hinge structure, and another end rotated toward the another side of the seat and unfolded;
   a second arm having one end connected to the another end of the first arm in a hinge structure and another end rotated and unfolded toward a front side of the seat; and
   a buckle having one end connected to the another end of the second arm in a hinge structure, and another end rotated toward an upper portion of the seat and unfolded.

8. The seat belt device of claim 7, wherein:
   the first arm is rotated and unfolded about an X-axis;
   the second arm is rotated and unfolded about a Z-axis; and
   the buckle is rotated about a Y-axis.

9. The seat belt device of claim 7, wherein at least one of the first arm or the second arm are configured to be adjusted in length in the lengthwise direction.

10. The seat belt device of claim 7, wherein the first arm is coupled by a fixation mechanism provided on the seat or the floor part to be maintained in an unfolded state.

11. The seat belt device of claim 10, wherein the fixation mechanism is a latch that is caught on an upper or lower surface of the first arm through a rotation.

12. The seat belt device of claim 10, wherein the fixation mechanism is a slide locker that is inserted into and caught to the first arm through a sliding movement.

13. The seat belt device of claim 1, wherein the belt post is mounted on a seat frame moved together with the seat.

14. The seat belt device of claim 1, further comprising:
   a first slave sensor installed at a designated position of the belt post;
   a second slave sensor installed at a designated position of the buckle post;

a master sensor installed at the seat and configured to detect the positions of the first and second slave sensors through communication with the first and second slave sensors; and a controller configured to determine whether the positions of the first and second slave sensors detected through the master sensor are within a normal installation area and determine whether the belt post and the buckle post are installed normally.

15. A vehicle comprising the seat belt device of claim 1.

16. A method of mounting a seat belt device in a vehicle, the method comprising the steps of:
when a belt post is mounted on one side of a seat, detecting, by a master sensor installed on the seat, a position of a first slave sensor installed at a designated position on the belt post;
determining, by a controller, whether the position of the first slave sensor is within a normal installation area and determining whether the belt post is installed normally;
when it is determined that the belt post is installed normally, rotating a multi-joint structure of the buckle post to position the buckle on another side of the seat;
when a buckle post is mounted on the another side of the seat, detecting, by the master sensor, a position of a second slave sensor installed at a designated position on the buckle post; and
determining, by a controller, whether the position of the second slave sensor is within a normal installation area and determining whether the belt post is installed normally.

17. The method of claim 16, wherein, when it is determined that the belt post is installed normally in the first position determination operation, a message related to an operation of moving the buckle post is transmitted.

18. The method of claim 16, wherein, when it is determined that the belt post is installed abnormally in the determining step, a message related to incorrect installation of the belt post and a message inducing re-installation of the belt post are transmitted.

19. The method of claim 16, wherein, when it is determined that the buckle post is installed abnormally in the detecting step, a message inducing a position adjustment of the buckle is transmitted.

20. A seat belt device for a vehicle, the seat belt device comprising:
a belt post having a seat belt assembly, the belt post being mounted inside an interior of the vehicle, wherein a webbing of a seat belt is provided at one side of a seat, and
a buckle post in which an arm and a buckle are connected to the belt post in a multi-joint structure, and the buckle is positioned on another side of the seat due to joint rotation of the arm and the buckle,
wherein the buckle post is mounted on an outer surface of the belt post.

* * * * *